(12) United States Patent
Cao et al.

(10) Patent No.: US 9,898,466 B2
(45) Date of Patent: Feb. 20, 2018

(54) MEDIA PREFERENCE AFFINITY RECOMMENDATION SYSTEMS AND METHODS

(71) Applicant: Rhapsody International Inc., Seattle, WA (US)

(72) Inventors: Heng Cao, Sammamish, WA (US); Mario Raymond Gerard, Seattle, WA (US); Aaron Clark Griffith, Kent, WA (US); Yu Wu, Issaquah, WA (US); Nathan Kent Rozendaal, Tacoma, WA (US); Benyi Wang, Issaquah, WA (US)

(73) Assignee: RHAPSODY INTERNATIONAL INC., Seattle, WA (US)

( * ) Notice: Subject to any disclaimer, the term of this patent is extended or adjusted under 35 U.S.C. 154(b) by 0 days.

(21) Appl. No.: 15/217,828

(22) Filed: Jul. 22, 2016

(65) Prior Publication Data
US 2018/0025005 A1    Jan. 25, 2018

(51) Int. Cl.
*G06F 7/00* (2006.01)
*G06F 17/30* (2006.01)
*H04L 29/06* (2006.01)

(52) U.S. Cl.
CPC .. *G06F 17/30038* (2013.01); *G06F 17/30035* (2013.01); *G06F 17/3053* (2013.01); *H04L 67/42* (2013.01)

(58) Field of Classification Search
CPC ......... G06F 17/30038; G06F 17/30035; G06F 17/3053; H04L 67/42
USPC ....................................................... 707/734
See application file for complete search history.

(56) References Cited

U.S. PATENT DOCUMENTS

| | | | |
|---|---|---|---|
| 7,696,427 B2 * | 4/2010 | West | G06N 99/005 706/46 |
| 2006/0053449 A1 * | 3/2006 | Gutta | H04N 7/17318 725/46 |
| 2007/0028266 A1 * | 2/2007 | Trajkovic | G06Q 30/02 725/46 |
| 2009/0049045 A1 * | 2/2009 | Askey | G06F 17/30761 |
| 2009/0055377 A1 * | 2/2009 | Hedge | G06F 17/30029 |
| 2009/0271416 A1 * | 10/2009 | White | G06F 17/30029 |
| 2010/0088151 A1 * | 4/2010 | Kim | G06Q 30/02 705/7.29 |
| 2010/0318544 A1 * | 12/2010 | Nicolov | G06F 17/30035 707/759 |
| 2013/0046766 A1 * | 2/2013 | Shishido | G06F 17/30752 707/741 |
| 2013/0061259 A1 * | 3/2013 | Raman | H04H 60/32 725/14 |
| 2013/0081084 A1 * | 3/2013 | Scheer | H04N 21/2408 725/46 |

(Continued)

*Primary Examiner* — Binh V Ho
(74) *Attorney, Agent, or Firm* — AEON Law PLLC; Adam L. K. Philipp; Jonathan E. Olson

(57) ABSTRACT

The present systems and methods relate to a concept for providing media recommendations targeted to particular, "subject" user. The present systems and methods involve obtaining historical usage data associated with the subject user; identifying candidate users; calculating media preference overlap scores with respect to the subject user and each candidate user; ranking the candidate user according to their media preference overlap scores, and generating recommendations for the subject user from the historical usage data associated with the candidate users.

30 Claims, 13 Drawing Sheets

(56) References Cited

U.S. PATENT DOCUMENTS

| | | | |
|---|---|---|---|
| 2014/0258275 A1* | 9/2014 | Paritosh | G06F 17/3097 707/723 |
| 2015/0066685 A1* | 3/2015 | Stoikov | G06Q 30/0631 705/26.7 |

* cited by examiner

MEDIA PREFERENCE AFFINITY RECOMMENDATION SYSTEMS AND METHODS

FIELD

The present disclosure relates to computing, and more particularly, to systems and methods for predicting and matching user preferences with regard to digital media being presented on computing devices.

BACKGROUND

An online media provider may offer users access to digital copies of works of authorship (herein collectively referred to as "media works" and/or "media content") to users on a per-work and/or subscription basis through a digital media distribution system. The media works may, for example, include sound recordings, musical works, motion picture works (or other audiovisual works), pictorial works, graphic works, literary works, dramatic works, choreographic works, and the like. Common examples of media works provided by an online media provider are digital audio recordings of songs and/or digital audiovisual recordings of films and/or television episodes.

An online media provider may utilize a client/server model to implement its digital media distribution system. A client/server model is a distributed computing application structure that partitions tasks and/or workloads between servers and client devices (a client device broadly refers to a piece of computer hardware that makes requests to a server). The server is often (but is not required to be) located at a remote location with respect to the client device, in which case the client may access the remote server's services by way of a network. A server may host (or run) one or more computer programs, referred to herein as services, which provide resources upon request to a computer program operating on a client device, referred to herein as a client application. A client application may request a service to provide the client application with content or to perform a function on behalf of the client application, but is typically not required to share any of its local resources with the service. Clients therefore typically initiate communication sessions with servers which await incoming requests via the network.

In the context of a digital media distribution system, a user operating a client device, such as a personal computer or a mobile phone, may run a client media application and access a media distribution service running on a remote server operated by the online media provider. Collectively, the client media application and the media distribution service may enable a user to:

(1) browse media content, including media content the user has already purchased and/or licensed from the online media provider, as well as new media content available from the online media provider's catalog of media works;
(2) create, view, and modify a user profile associated with the user's account;
(3) provide user profile data, including data related to the user's subjective media work preferences;
(4) selectively view user profiles associated with other users' accounts and selectively create connections between the current user's account and the profiles of other users (e.g. by "following," "favoriting," or "friending" another user);
(5) selectively interact with particular media works and/or sets of media works including by executing, displaying, or performing them, and/or by sharing them with other users; and
(6) selectively indicate a subjective preference for a particular media work, set of media works, media work author or artist, and/or genres of media works.

Discovering New Media Content Using Recommender Systems

Users of a digital media distribution system may desire to be exposed to new media content, but due to the vast amount of media content available and the idiosyncrasies of personal taste, simply searching through an un-curated catalog of an online media provider may not be efficient or satisfying to the user. Therefore, an online music store may provide a media recommender service for its users.

Conventional recommender (or recommendation) services may employ information filtering techniques that seek to predict how a user will respond to a given item, e.g. a particular media work. Recommender services may be applied in a variety of applications, such as providing consumer-level recommendations for media works such as movies, music, news, books, research articles, search queries, social tags, and products in general. Conventional recommender services have also been optimized for subject matter experts, businesses, service providers, restaurants, financial services, life insurance, persons (e.g. online dating), and the like.

Conventional recommender systems typically produce a list of recommendations through either collaborative filtering or content-based filtering techniques. Collaborative filtering uses the past behavior (e.g. previously purchased items and/or ratings given to those items) of other users to predict items (or ratings for items) that the current user may have an interest in. On the other hand, content-based filtering utilizes discrete characteristics of an item in order to identify additional items with similar properties. Hybrid recommendation systems may use a combination of these and other approaches.

The differences between conventional collaborative and content-based filtering can be demonstrated by comparing their respective use in the context of generating music recommendations for a user.

A conventional music recommender system that uses collaborative filtering may observe which artists, albums and individual tracks a user listens to on a regular basis and compares the user's listening behavior against the listening behavior of other users. The music recommendation service may create a set of recommended tracks for a user by identifying a set of tracks the user plays frequently, identifying other users who play some or all of the same tracks frequently, and then identifying tracks are also played frequently by those other users but that have not been played by the user requesting the recommendation. Such a system requires a large amount of information about its users in order to make accurate recommendations (sometimes referred to as the "cold start problem").

A music recommender system that uses content filtering uses the properties of a selected song or artist to identify other songs or artists with similar properties (such as a particular genre, tempo, instrumentation, style, era, mood, or geographical region) and create a set of songs with those properties. User feedback may be used to refine the system's results, deemphasizing certain attributes when a user "dislikes" a particular song with those attributes and emphasizing other attributes when a user "likes" a song with those attributes. A content filtering recommender system requires minimal information about the user to generate recommendations but therefore is not able to effectively utilize such personalized information in making its recommendations.

DESCRIPTION

Figure 1:
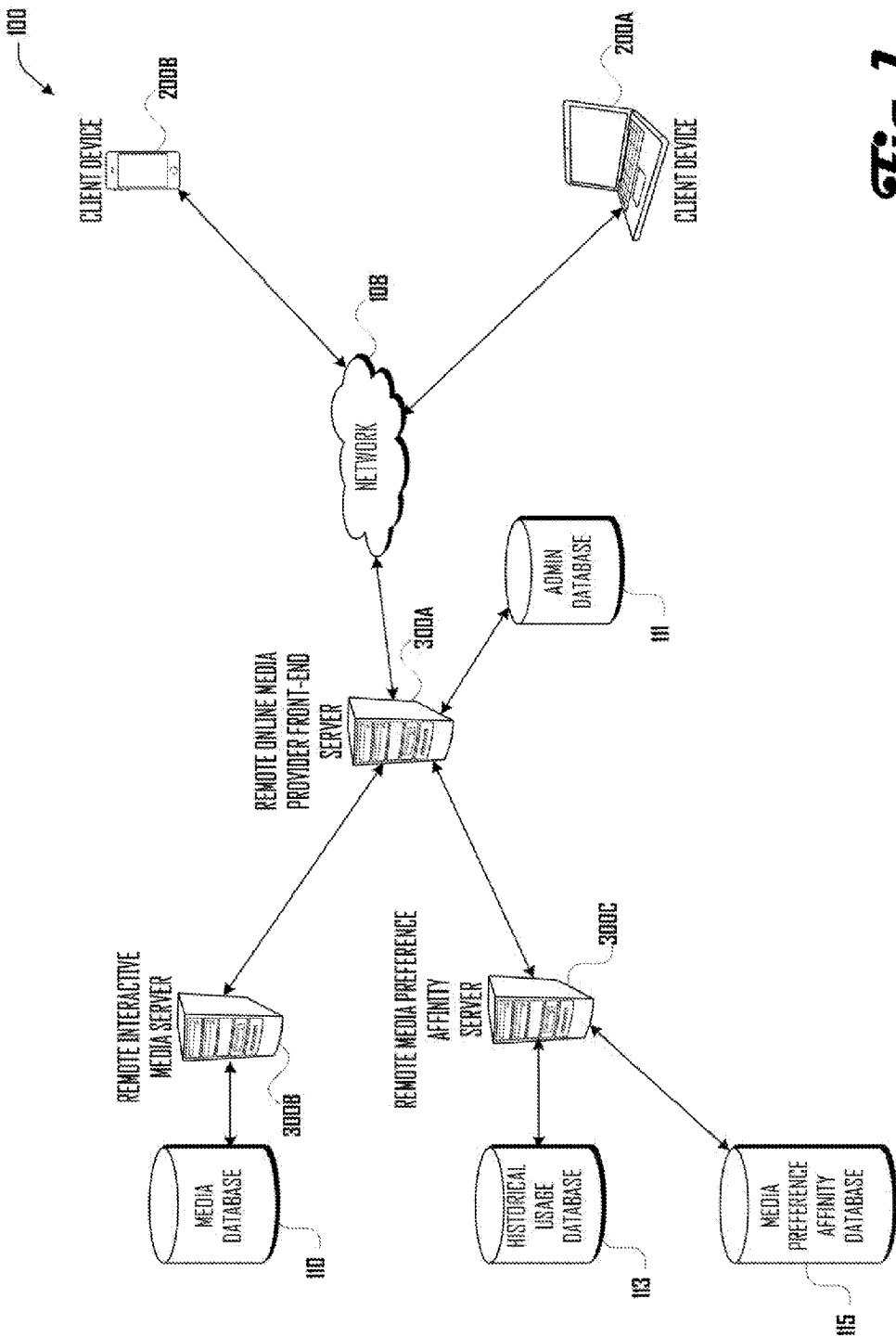
FIG. 1 illustrates an exemplary network topology of a client/server-based media distribution system in accordance with various embodiments.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file servers, computer servers, and/or memory storage devices. Each of these conventional distributed computing components is accessible by the processor via a communication network, which may include, but is not limited to, the Internet.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein. For example, the embodiments set forth below are primarily described in the context of providing recommendations of media works, specifically sound recordings, based on a given input, or seed, media work. However, these embodiments are exemplary and are in no way limited to the type of item for which recommendations are being generated.

Exemplary Network Topology of a Client/Server-Based Digital Media Distribution System FIG. 1 illustrates a first exemplary client/server-based digital media distribution system 100 in accordance with various embodiments. Client devices 200A-B and a remote online media provider front-end server ("remote front-end server") 300A are in data communication with a network 108. In various embodiments, network 108 may include the Internet, one or more local area networks ("LANs"), one or more wide area networks ("WANs"), cellular data networks, and/or other data networks. Network 108 may, at various points, be a wired and/or wireless network. Remote front-end server 300A may be in data communication with a remote interactive media server 300B, a remote media preference affinity server 300C, and an administrative database 111. Remote interactive media server 300B may be in data communication with a media database 110. Remote media preference affinity server 300C may be in data communication with a historical usage database 113 and a media preference affinity database 115.

In these and other embodiments, client devices 200, such as client device 200A and client device 200B, may be networked computing devices having form factors including general purpose computers (including "desktop," "laptop," "notebook," "tablet" computers, or the like); mobile phones; watches, glasses, or other wearable computing devices; dedicated media players; motor vehicle head units; audio-video on demand (AVOD) systems; dedicated media consoles; or the like. For simplified exemplary purposes, two client devices are shown, one of which is depicted as a mobile phone and the other of which is depicted as a laptop computer. In various embodiments there may be many more client devices 200. The primary functional components of an exemplary, form-factor-independent client device 200 are described below in reference to FIG. 2.

In various embodiments, remote front-end server 300A, remote interactive media server 300B, and remote media preference affinity server 300C may be networked computing devices generally capable of accepting requests over network 108, e.g. from client devices 200, each other, various databases, and/or other networked computing devices (not shown), and providing responses accordingly. The primary functional components of an exemplary remote server 300, such as remote front-end server 300A, remote interactive media server 300B, and remote media preference affinity server 300C are described below in reference to FIG. 3.

Exemplary Client Device

Figure 2:
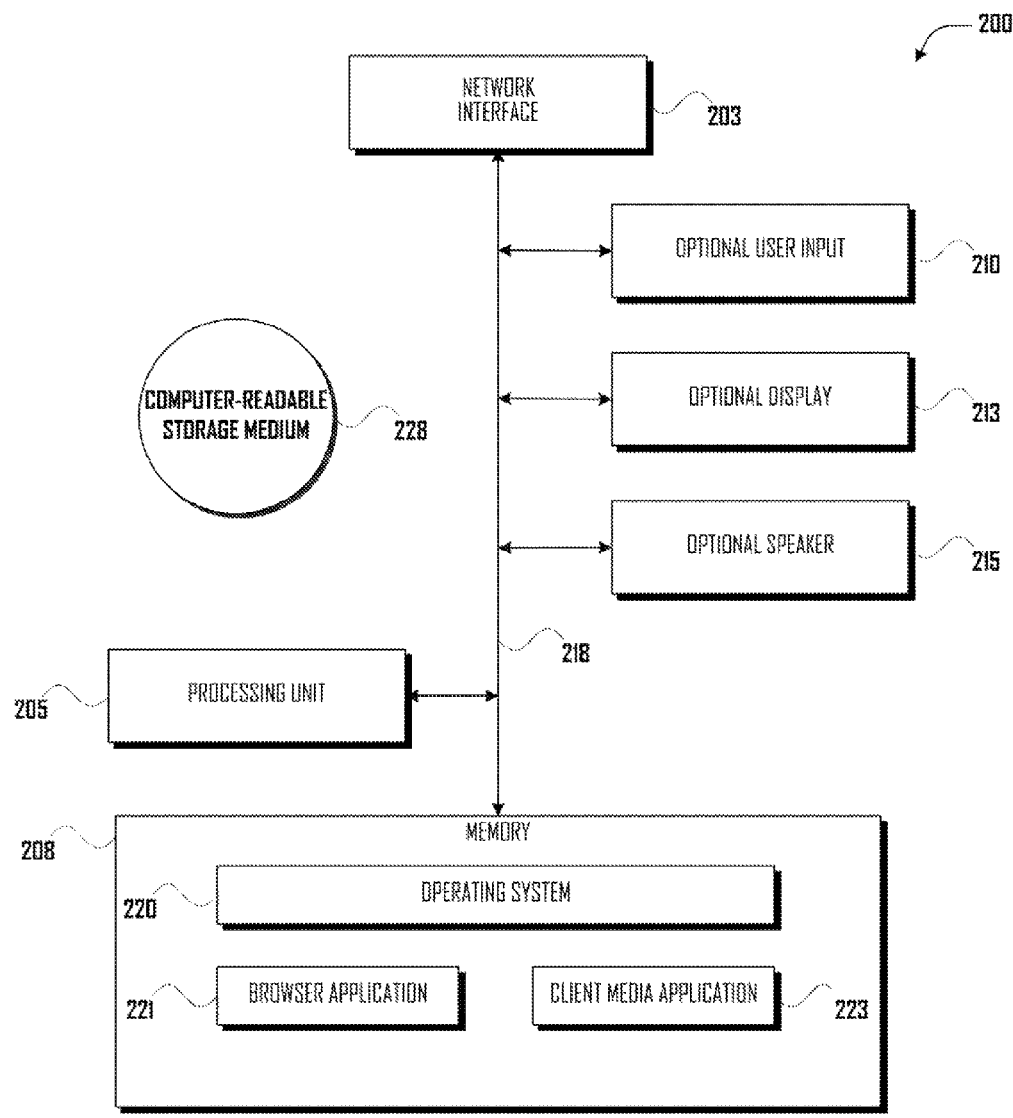
FIG. 2 illustrates several components of an exemplary client device in accordance with at least one embodiment.

Referring to FIG. 2, several components of an exemplary client device 200 are illustrated. In some embodiments, a client device 200 may include many more components than those shown in FIG. 2. However, it is not necessary that all of these generally conventional components be shown in order to disclose an illustrative embodiment. As shown in FIG. 2, exemplary client device 200 includes a network interface 203 for connecting to a network, such as network 108. Exemplary client device 200 also includes a processing unit 205, a memory 208, an optional user input 210 (e.g. an alphanumeric keyboard, keypad, a touchscreen, and/or a microphone), an optional display 213, an optional speaker 215, all interconnected along with the network interface 203 via a bus 218. The memory 208 generally comprises a RAM, a ROM, and a permanent mass storage device, such as a disk drive, flash memory, or the like.

The memory 208 of exemplary client device 200 stores an operating system 220 as well as program code for a number of software applications, such as a browser application 221 and/or a client media application 223. Browser application 221 is a software application for retrieving, presenting, and traversing information resources on a network, such as network 108. Although browser application 221 may be primarily intended to use the World Wide Web, it may also be used to access information resources provided by remote servers in private networks. An information resource may be a web page, an image, a video, or other piece of content and may be identified by a Uniform Resource Identifier (URI/URL) on network 108. An information resource may also provide browser application 221 executable program code for web applications, i.e. a software application that runs in and is rendered by browser application 221.

Memory 208 may also store executable instructions for decoding data files encoded according to various known coding standards and for presenting data files representing audio and/or video content, e.g. via optional display 213 and/or optional speaker 215, as well as media data files (not shown) representing copies of media works, such as, by way of non-limiting examples, sound recordings, audio/video recordings, images, songs, videos, photographs, books, articles, or the like. These software components and media data files may be loaded into memory 208 via network interface 203 (or via a computer readable storage medium 228, such as a memory card or the like). Although an exemplary client device 200 has been described, a client device 200 may be any of a great number of networked computing devices capable of communicating with network 108 and executing program code, such as the program code corresponding to browser application 221 and/or client media application 223.

In operation, the operating system 220 manages the hardware and other software resources of the client device 200 and provides common services for software applications, such as browser application 221 and/or client media application 223. For hardware functions such as network communications via network interface 203, receiving data via input 210, outputting data via optional display 213 and/or optional speaker 215, and allocation of memory 208, operating system 220 acts as an intermediary between software executing on client device 200 and the hardware. (In the case of a web application, the browser application 221 similarly acts as an intermediary between the web application's program code and the operating system 220.)

For example, operating system 220 may cause a representation of available software applications, such as client media application 223, to be presented to a user of client device 200 via display 213. If the user indicates, e.g. via optional input 210, a desire to use client media application 223, operating system 220 may instantiate a client media application process (not shown), i.e. cause processing unit 205 to begin executing the executable instructions of the client media application and allocate a portion of memory 208 for its use. If the user indicates, e.g. via optional input 210, a desire to use browser application 221, operating system 220 may instantiate a browser application process (not shown), i.e. cause processing unit 205 to begin executing the executable instructions of the browser application and allocate a portion of memory 208 for its use.

Exemplary Remote Server

Figure 3:
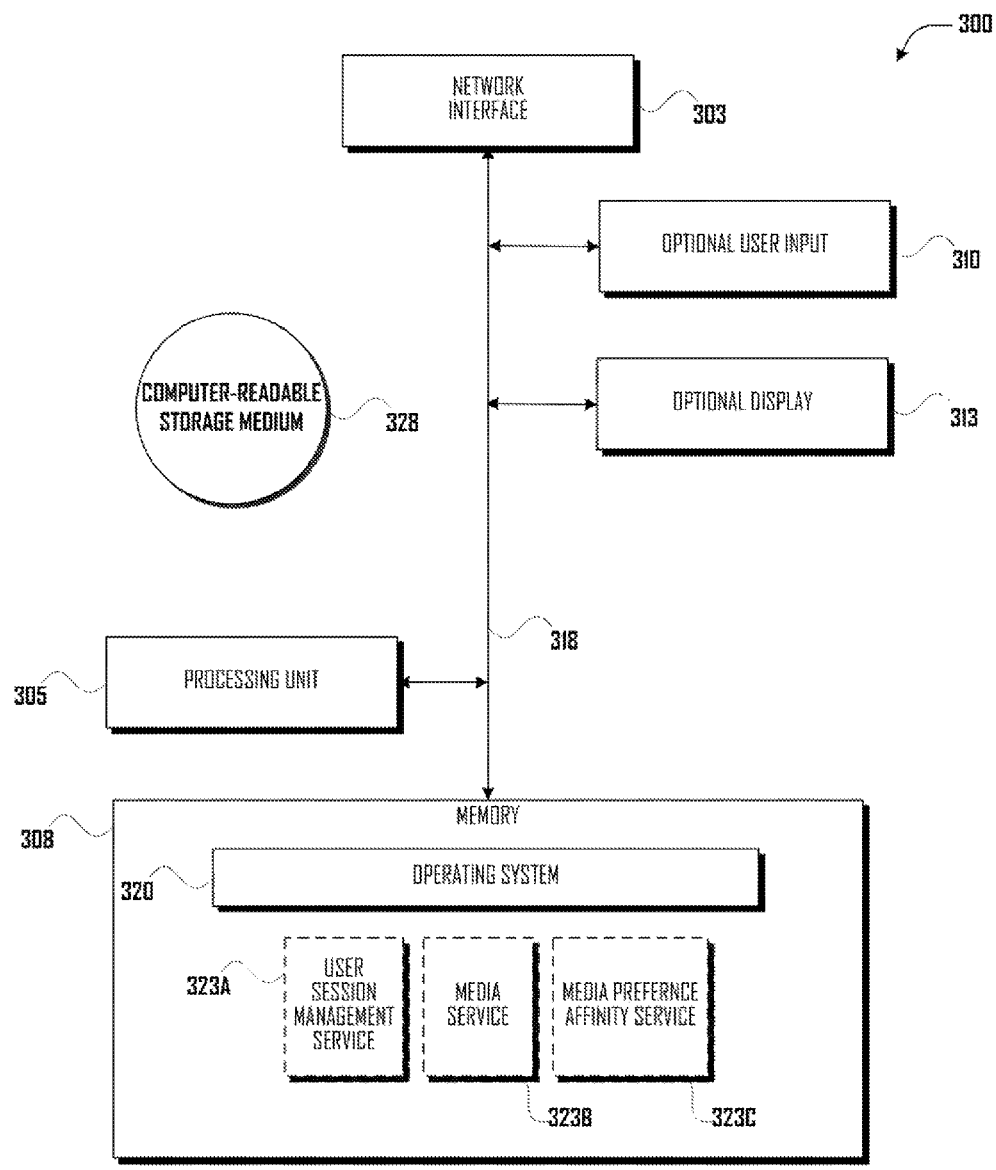
FIG. 3 illustrates several components of an exemplary remote server in accordance with at least one embodiment.

Referring now to FIG. 3, several components of an exemplary remote server 300, such as remote front-end server 300A, remote interactive media server 300B and remote media preference affinity server 300C, in accordance with at least one exemplary embodiment, are illustrated. In some embodiments, a remote server 300 may include many more components than those shown in FIG. 3. However, it is not necessary that all of these generally conventional components be shown in order to disclose an illustrative embodiment. As shown in FIG. 3, a remote server 300 includes a network interface 303 for connecting to a network, such as network 108. A remote server 300 also includes a processing unit 305, a memory 308, an optional user input 310, and an optional display 313, all interconnected along with the network interface 303 via a bus 318. The memory 308 generally comprises a random access memory ("RAM"), a read only memory ("ROM"), and a permanent mass storage device, such as a disk drive.

Memory 308 stores an operating system 320 and program code for various software services. For example, remote front-end server 300A may include executable instructions for performing remote user session management service 323A (indicated by dotted lines); remote interactive media server 300B may include executable instructions for performing remote media service 323B (indicated by dotted lines); and remote media preference affinity server 300C may include executable instructions for performing remote media preference affinity service 323C (indicated by dotted lines).

Program code for these and other such software services or other software components may be loaded into memory 308 from a non-transient computer readable storage medium 328 of a remote server 300 using a drive mechanism (not shown) associated with the non-transient computer readable storage medium, such as, but not limited to, a DVD/CD-ROM drive, memory card, or the like. Software components may also be loaded into memory 308 via the network interface 303, rather than via a computer readable storage medium 328. Remote server 300 may also communicate via bus 318 with a database, such as media database 110, or other local or remote data store (not shown). In some embodiments, a remote server 300 may comprise one or more replicated and/or distributed physical or logical devices. In some embodiments, one or more of remote front-end server 300A, remote interactive media server 300B, and/or remote media preference affinity server 300C may be embodied by the same physical device.

Client/Server-Based Digital Media Distribution Systems

Referring collectively to FIGS. 1-3, and as is described in more detail below, remote user session management service 323A operating on remote front-end server 300A and remote interactive media service 323B operating on remote interactive media server 300B may be operated in furtherance of an online media provider (not shown) providing digital copies of media works, such as audio content, video content, literary content, news content, and the like, on a per-work and/or subscription basis e.g. to users of client devices 200 via client media application 223 (or a web application with similar functionality). Digital copies of such media works may be retained in media database 110, indexed by identifying indicia, e.g. a string of alphanumeric characters uniquely corresponding to a particular media work (referred to herein as a "media work ID" and/or a media work identifier). Media database 110 may also contain meta-data for such media works, for example describing various properties of the media works (such as author/artist, genre, publisher, title, length, and the like), also indexed by media work ID. Media database 110 may also contain data relating to users of the on-line media store, including data relating to a given user's usage history.

Client media application 223 may act as an interface between a user of client device 200 and remote user session management service 323A operating on remote front-end server 300A. Upon instantiation, client media application 223 may send a "create new session" request to remote user session management service 323A, for example including identifying information for client device 200, identifying information for the particular instantiation of client media application 223, and/or user-account credentials such as a user name and password, obtained from the user or stored in memory 208. If presented, the user-account credentials may be associated with an existing user account or with a generic, temporary, and/or anonymous "guest" account.

Remote user session management service 323A may create a corresponding user session (not shown) associated with the particular instantiation of client media application 223, identified by a user-session identifier (referred to herein as a "session ID") and may obtain user account information, such as a user identifier, associated with the provided identifying information from administrative database 111 and provide a response to client media application 223, which may include information related to features and services provided by the on-demand media service which the user-account associated with the user-account credentials are authorized to access.

Client media application 223 may then present the user with a menu of options, e.g. via optional display 213, and wait for the user to indicate a selection of a specific option, e.g. via optional input 210. Such options may include requesting the presentation of a locally stored media work, i.e. interactively accessing media data files (not shown) stored in memory 208, and/or requesting the presentation of remotely stored media works, i.e. interactively accessing media data files stored in other locations on network 108, such as media database 110. Another option may be requesting to view a list of users with similar subjective media preferences in order to discover new media works.

These requests are provided to remote user session management service 323A operating on remote front-end server 300A. User session management service 323A may process the requests, provide related internal requests to interactive media service 323B and/or media preference affinity service 323C, obtain responses from interactive media service 323B and/or media preference affinity service 323C, provide responses to client media application 223, and store records of these requests and responses and other related data, e.g. in administrative database 111 indexed by a user identifier and/or a user session identifier.

Client/Server-Based Digital Media Distribution System with a Media Preference Affinity Service Still referring to FIGS. 1-3, as noted above, one way an online media provider may encourage a subject user to discover new content is by providing the subject user with information regarding the content other users choose to interact with. However, because media work preferences are largely subjective, it is unlikely that basing such information on the historical usage of a random group of other users will result in useful recommendations being made to the subject user.

As used herein, a user's "historical usage data" refers to data records detailing the user's past interaction with the features, services, etc. of the client/server-based digital media distribution system, which may be indexed by a user identifier associated with the user's account.

As used herein, a subject user identifier's "media preference affinity" with respect to another user identifier is a qualitative description of the extent to which the set of media works to which the subject user will have a positive subjective reaction overlaps with the set of media works to which the other user has had a positive subjective reaction, as further described herein.

In accordance with the present methods and systems, an online media provider may provide media preference affinity service 323C as a component of a digital media distribution system, such as digital media distribution system 100. In accordance with various aspects of the present embodiments, and as is described in greater detail below, media preference affinity service 323C may utilize historical usage data associated with the users of the digital media distribution system to provide an instantiation of client media application 223 associated with a subject user identifier with set of recommended candidate user identifiers that the media preference affinity service predicts will have a high degree of media preference affinity with the subject user identifier. In accordance with some embodiments, media preference affinity service 323C may also determine a subject user's preferred genres of media works and then generate genre-specific sets of recommended media content identifiers from one or more categorical classes of media content, such as media works, media work authors, media work sets, and the like, associated with each of the recommended candidate user identifiers.

Media preference affinity service 323C may select candidate user identifiers by analyzing the subject user's historical usage data to identify user identifiers and media content identifiers that the subject user has positively interacted with. For example, media preference affinity service 323C may identify those users the subject user has selectively connected with (e.g. by "friending," "following," or "favoriting" a user) and the media work identifiers, media work author identifiers, and media work set identifiers the subject user identifier most frequently interacts with (e.g. by streaming, downloading, rendering, or purchasing media works associated with the media content identifier). Media preference affinity service 323C may then use the identified media content identifiers to identify additional candidate user identifiers who have also had frequent positive interactions with the identified media work identifiers, media work author identifiers, and media work set identifiers.

After media preference affinity service 323C identifies the set of candidate users, it may determine a media preference overlap score with respect to the subject user identifier and each candidate user identifier. The media preference overlap score between the subject user identifier and a candidate user identifier acts as a quantifiable measure of the subject user identifier's media preference affinity with the candidate user. The media preference overlap score may be determined with respect to a particular categorical class of media content and/or with respect to a particular media work genre. For example, media preference affinity service 323C may compare historical usage data from the subject user to historical usage data for a candidate user and determine the number of media works from a specified genre of media works that both users have had a positive interaction with.

In some embodiments if, for example, the relevant categorical class of media content and genre are musical artists and jazz music, then media preference affinity service 323C may (1) search the subject user's historical usage data and identify a number ($I_{subj}$) of positive interactions with media work author identifiers associated with a media genre identifier corresponding to jazz music; (2) search the candidate user's historical usage data and identify a number ($I_{cand}$) of positive interactions with media work author identifiers associated with the media genre identifier corresponding to jazz music; and (3) compare both user's historical usage data and identify a number j of media work authors associated with the jazz media genre identifier having positive interactions with both the subject user identifier and the candidate user identifier. In the present example, media preference affinity service 323C may then determine a raw media preference overlap score ($S_R$) between the subject user identifier and the candidate user identifier using the equation:

$$S_R = \frac{q_{sf} j}{I_{subj} + I_{cand}}$$

where $q_{sf}$ represents an optional scaling factor.

Media preference affinity service 323C may also normalize the raw media preference overlap score between the subject user identifier and the candidate user identifier. For example, a normalized media preference overlap score ($S_N$) may be calculated using the equation:

$$S_N = 10\sqrt{10\sqrt{10\sqrt{S_R}}}$$

After a normalized media preference overlap score has been determined between the subject user and each of the candidate users, user preference affinity service 323 may then rank the candidate users according to their respective normalized media preference affinity score. The historical usage history of the top ranked candidate users may then be further analyzed to generate media content recommendations for the subject users.

In some embodiments, in accordance with the concepts described above, upon obtaining an appropriate request from user session management service 323A specifying at least one subject user identifier (and, optionally, a particular media genre), media affinity service 323C may:

(1) search historical usage data associated with the subject user identifier (or subject user identifiers) and identify a set of preferred media content identifiers in one or more categorical classes, such as a set of preferred media work identifiers, a set of preferred media work set identifiers (which may correspond to pre-defined sets of media works, such as albums, or user-defined sets of media works, such as user-created song playlists), and/or a set of preferred media work author identifiers (as used herein, media work author may also refer to a media work performer);

(2) identify a set of candidate user identifiers corresponding to users who have also indicated a subjective preference for at least one of the media content identifiers identified in (1), above;

(3) obtain a media preference overlap score for each of the candidate user identifiers with respect to the subject user identifier, using one or more user candidate ranking techniques;

(4) rank the set of candidate user identifiers according to the identifiers' media preference overlap score with respect to the subject user identifier;

(5) select a number b of candidate users to recommend and filter the ranked set of candidate users to remove all but the b highest ranked candidate user identifiers;

(6) provide user session management service 323A with the set of b high-ranking candidate user identifiers in response to the request.

Media affinity service 323C may further:

(7) obtain historical usage data associated with a candidate identifier to identify a set of candidate media content identifiers in one or more categorical classes of media content, such as media works, media work sets, media work authors, and/or the like having a positive interaction history with the candidate user identifier;

(8) use one or more ranking factors to rank the set of candidate media content identifiers according to a measure of the candidate user identifier's subjective preferences regarding the candidate media content identifiers, for example by ranking according to the candidate user identifier's total interaction count, recent interaction frequency, and/or the like;

(9) optionally filter the ranked set of candidate media content identifiers to remove all candidate media content identifiers not associated with a specified media work genre;

(10) filter the set of candidate media content identifiers to remove all candidate media content identifiers the subject user identifier has recently interacted with (e.g. in the last 30 days or the last five hundred media work interactions);

(11) select a minimum and maximum number of recommendations and (a) if the number of media content identifiers in the set of candidate media content identifiers is less than the minimum, fill in the set of candidate media content identifiers using recommendations from top rated users in the specified media work genre or (b) if the number of media content identifiers in the set of candidate media content identifiers is greater than the maximum, remove the excess media content identifiers; and

(12) provide user session management service 323A with the user-based, genre-specific, ranked, filtered set of recommended media content identifiers.

User session management service 323A may then provide the ranked set of recommended media content identifiers to the requesting instantiation of client media application 223.

If the subject user identifier makes a selection of a particular media work, the requesting instantiation of client media application 223 may then select one or more corresponding media work identifiers from the ranked set of recommended media work identifiers, and provide corresponding media work requests to user session management service 323A. User session management service 323A may pass the media work requests to interactive media service 323B. Interactive media service 323B may obtain copies of media works corresponding to the requested media work identifiers, e.g. from media database 110, and provide them user session management service 323A, which in turn may provide the copies of the digital media works to the requesting instantiation of client media application 223.

Exemplary Series of Communications

Figure 4:
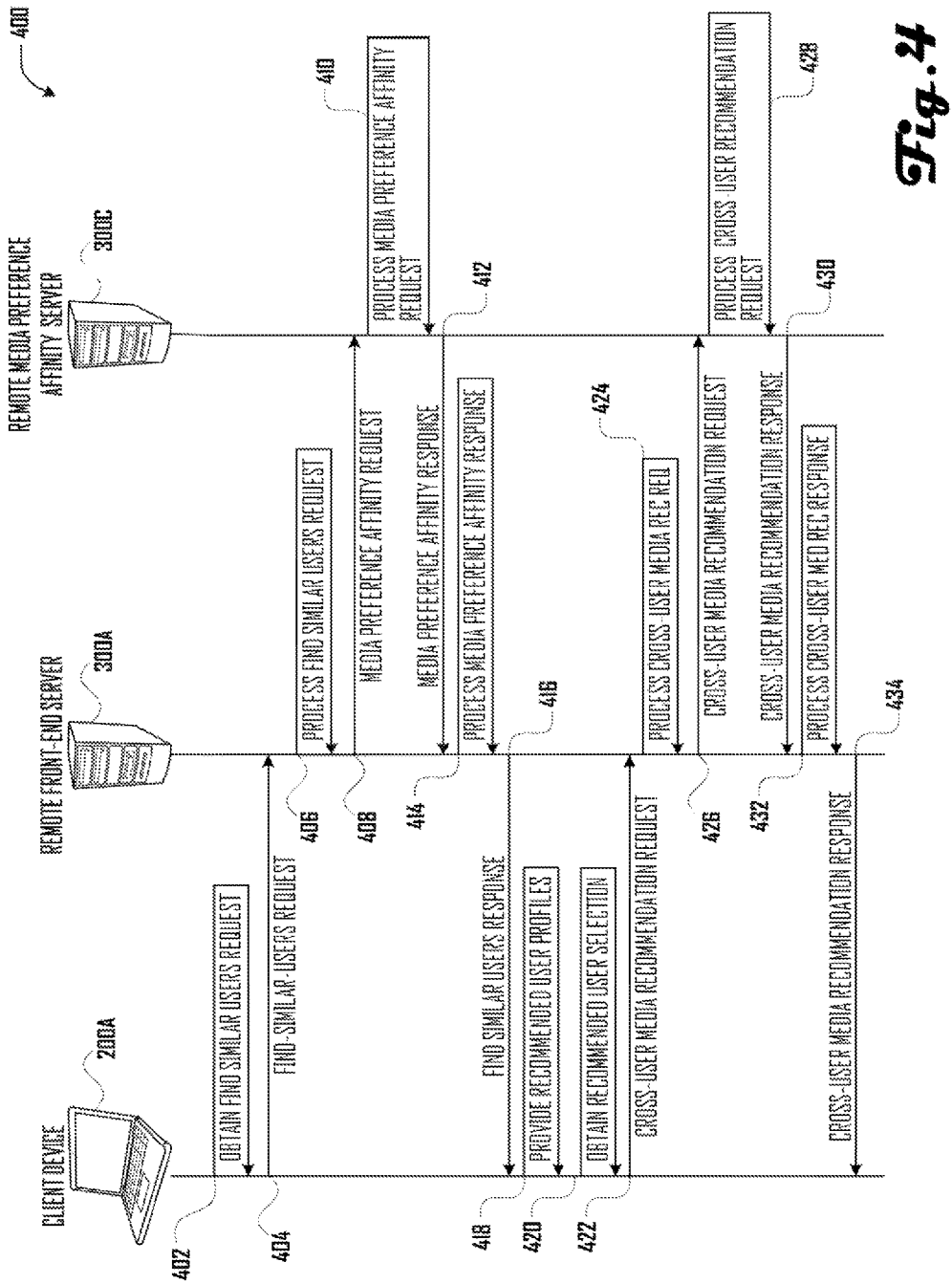
FIG. 4 illustrates exemplary series of communications between various devices in accordance with at least one embodiment.

FIG. 4 illustrates an exemplary series of communications 400 between client device 200A, remote front-end server 300A, and remote media preference affinity server 300C in accordance with various embodiments of a digital media distribution system, such as digital media distribution system 100. Exemplary series of communications 400 is illustrated and described as relating to generating and providing recommendations with regard to media works. However, the same series of communications could be applied to generating and providing recommendations with regard to other categories of media work content such as sets of media works (albums, compilations, playlists, etc.), media work authors, media work performers, media work publishers, and the like.

The illustration of exemplary series of communications 400 begins with client device 200A obtaining 402 a find-similar-users request, e.g. via optional user input 210.

Client device 200A may provide a corresponding find-similar-users request 404 to remote front-end server 300A. Find-similar-users request 404 may include a user session identifier associated with an instantiation of client media application 223 operating on client device 200A.

Remote front-end server 300A may process 406 find similar user request 404, e.g. by obtaining user data, such as a user identifier associated with the user session identifier and meta-data associated with the user identifier and by providing a corresponding media preference affinity request 408 to remote media preference affinity server 300C.

Remote media preference affinity server 300C may process 410 media preference affinity request 408, for example by performing instructions causing the remote media preference affinity server to analyze historical usage data in order to identify other users of the online media provider with similar subjective media preferences. In some embodiments, for example, remote media preference affinity sever 300C may perform media preference affinity media preference affinity routine 500, described below in reference to FIG. 5. Remote media preference affinity server may then provide a media preference affinity response 412. Media preference affinity response 412 may include data corresponding to a set of recommended users. For example, media preference affinity response 412 may include user identifiers for some or all of the set of recommended user identifiers or a pointer to a data storage location where such user identifiers may be obtained. Media preference affinity response 412 may also include a ranking associated with each recommended user identifier.

Remote front-end server 300A may process 414 media preference affinity response 412 and provide a find similar user response 416 to client device 200A. For example, remote front-end server 300A may obtain biographical and historical usage data associated with user identifiers corresponding to the recommended user set, process such data to obtain recommended user summary data, and provide the recommended user identifiers and corresponding recommended user summary data to client device 200A in media preference affinity response 414.

Client device 200A may process 418 find similar users response 416, for example by providing the recommended user profiles to the user—e.g., by causing optional display 213 to render human-comprehensible versions of the recommended user summary data.

Client device 200A may subsequently obtain 420 a recommended user selection, e.g. via optional user input 210, identifying at least one of the recommended user identifiers. Client device 200A may responsively provide a cross-user media recommendation request 422 to remote front-end server 300A specifying the user session identifier and the selected recommended user identifier.

Remote front-end server 300A may process 424 cross-user media recommendation request 422 and provide a corresponding cross-user recommendation request 426 to remote media preference affinity server 300C.

Remote media preference affinity sever 300C may process 428 cross-user recommendation request, for example by performing instructions causing the remote media preference affinity server to analyze historical usage data associated with the selected recommended user identifier and the current user identifier to identify a set of media works to which a user associated with the current user identifier is likely to have a positive subjective reaction. In some embodiments, for example, remote media preference affinity sever 300C may perform user-based content recommendation generation routine 1100, described below in reference to FIG. 11. Remote media preference affinity server 300C may then provide a cross-user media recommendation response 430 to front-end media server 300A. Cross-user media recommendation response 430 may include data corresponding to a set of recommended media works. For example, Cross-user media recommendation response 430 may include media work identifiers for some or all of the set of recommended media works or a pointer to a data storage location where such user identifiers may be obtained. Cross-user media recommendation response 430 may also include a ranking associated with each recommended media identifier.

Remote front-end server 300A may process 432 cross-user media recommendation response and provide a cross-user media recommendation response 434 to client device 200A. For example, remote front-end server 300A may obtain metadata associated with media work identifiers corresponding to the recommended media work set, process such data to obtain recommended media work summary data, and provide the recommended media work identifiers and corresponding recommended media work summary data to client device 200A in cross-user media recommendation response 434.

Media Preference Affinity Routine

Figure 5:
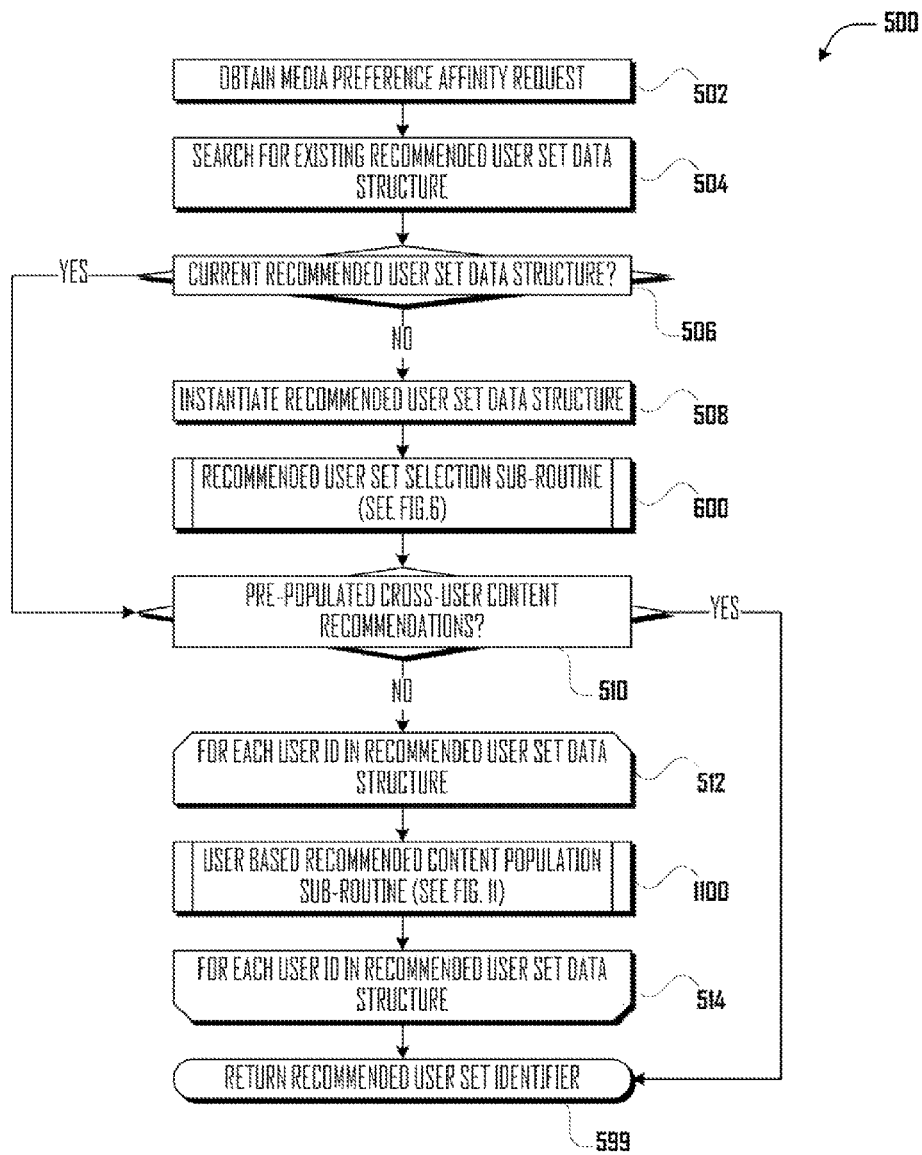
FIG. 5 illustrates a flow-diagram of a media preference affinity routine in accordance with at least one embodiment.

FIG. 5 illustrates a media preference affinity routine 500, which may be implemented by media preference affinity service 323 operating on remote media preference affinity sever 300C, e.g. in response to a media preference affinity request obtained from user session management service 323A.

Media preference affinity routine 500 may obtain a media preference affinity request at execution block 502. The media preference affinity request may include a user identifier corresponding to a particular user of an online media provider.

Media preference affinity routine 500 may search for an existing media preference affinity data structure associated with the provided user identifier, for example in media preference affinity database 115. For example, there may have been a recent media preference affinity request associated with the current user identifier or, media preference affinity service 323C may periodically perform batch jobs that generate and populate user preference affinity data structures for sets users in order to reduce response times to user preference affinity requests; however, in order to ensure user preference affinity data is current, such batched and stored data may be considered useful for a limited amount of time, e.g. one day, one week, and the like.

At decision block 506, if current media preference affinity data associated with the user identifier is located, media preference affinity routine 500 may proceed to decision block 510, described below; otherwise, media preference affinity routine 500 may proceed to execution block 508.

Media preference affinity routine 500 may instantiate a recommended user set data structure associated with the provided user identifier at execution block 508. Upon instantiation, a recommended user set data structure may be assigned a corresponding recommended user set identifier.

An exemplary recommended user set data structure upon instantiation:

rec_user_set_DS=NULL;

At sub-routine block 600, media preference affinity routine 500 may provide a recommended user set selection request to recommended user set selection sub-routine 600, described below in reference to FIG. 6. Sub-routine block 600 may result in the recommended user set data structure associated with the provided user identifier being populated with one or more recommended user identifiers, corresponding to user accounts whose associated historical usage data indicates similar subjective media preferences to the user account corresponding to the provided user identifier, and associated rankings indicating the relative degree of similarity of each recommended user.

The exemplary recommended user set data structure after the completion of sub-routine block 600:

rec_user_set_DS(user identifier){
   rec_user_ID_1 [NULL];
   rec_user_ID_2 [NULL];
   rec_user_ID_3 [NULL];
   . . .
   rec_user_ID_t [NULL]}

At decision block 510, if media preference affinity routine 500 determines it should pre-populate the recommended user set data structure with cross-user media work recommendations, then media preference affinity routine 500 may proceed to starting loop block 512; otherwise media preference affinity routine 500 may proceed to termination block 599. For example, media preference affinity routine 500 may, by default, not pre-populate the recommended user set data structure with cross-user media work recommendations, while media preference affinity request may include an optional pre-population flag whose value indicates whether routine media preference affinity service 323C should deviate from the default. In other embodiments, not shown, cross-user media work recommendations may be pre-populated for a sub-set of the highest ranked recommended users, e.g. the highest ranked user, the three highest ranked users, etc.

At starting loop block 512, media preference affinity routine 500 may process in turn each recommended user identifier in the recommended user set data structure.

At sub-routine block 1100, media preference affinity routine 500 may provide a user-based media content recommendation request to user-based media content recommendation sub-routine 1100, described below with reference to FIG. 11. Sub-routine block 1100 may populate the recommended user set data structure with up to u recommended media work identifiers associated with the current recommended user identifier.

At ending loop block 514, media preference affinity routine 500 may loop back to starting loop block 512 to process the next recommended user identifier in the recommended user set data structure, if any.

The exemplary recommended user set data structure after the completion of loop 512-514:

rec_user_set_DS(user identifier)(recommended media work set) {
   rec_user_ID_1 [rec_mw_ID_1, rec_mw_ID_2, . . . rec_mw_ID_u];
   rec_user_ID_2 [rec_mw_ID_1, rec_mw_ID_2, . . . rec_mw_ID_u];
   rec_user_ID_3 [rec_mw_ID_1, rec_mw_ID_2, . . . rec_mw_ID_u];
   . . .
   rec_user_ID_t[rec_mw_ID_1, rec_mw_ID_2, . . . rec_mw_ID_u]}

In the above example, the recommended user set data structure includes only a single category of recommended content: i.e. media work identifiers that correspond to individual media works. In other embodiments, the recommended user set data structure may have an additional categorical class dimension for storing s categories of user-based recommended media content, such as media author identifiers, media work set identifiers, media work genre/sub-genre identifiers, and the like.

An exemplary recommended user set data structure with categorical class dimension:

rec_user_set_DS(content category)(user identifier)(recommended content set) {
   cont_cat_ID_1[
     rec_user_ID_1 (rec_mw_ID_1, rec_mw_ID_2, . . . rec_mw_ID_u);
     rec_user_ID_2 (rec_mw_ID_1, rec_mw_ID_2, . . . rec_mw_ID_u);
     rec_user_ID_3 (rec_mw_ID_1, rec_mw_ID_2, . . . rec_mw_ID_u);
     . . .
     rec_user_ID_t (rec_mw_ID_1, rec_mw_ID_2, . . . rec_mw_ID_u)
   ]
   cont_cat_ID_2[
     rec_user_ID_1 (rec_mw_ID_1, rec_mw_ID_2, . . . rec_mw_ID_u);
     rec_user_ID_2 (rec_mw_ID_1, rec_mw_ID_2, . . . rec_mw_ID_u);
     rec_user_ID_3 (rec_mw_ID_1, rec_mw_ID_2, . . . rec_mw_ID_u);
     . . .
     rec_user_ID_t (rec_mw_ID_1, rec_mw_ID_2, . . . rec_mw_ID_u)
   ]
   . . .
   cont_cat_ID_s[
     rec_user_ID_1 [rec_mw_ID_1, rec_mw_ID_2, . . . rec_mw_ID_u];
     rec_user_ID_2 [rec_mw_ID_1, rec_mw_ID_2, . . . rec_mw_ID_u];
     rec_user_ID_3 [rec_mw_ID_1, rec_mw_ID_2, . . . rec_mw_ID_u];
     . . .
     rec_user_ID_t [rec_mw_ID_1, rec_mw_ID_2, . . . rec_mw_ID_u]
   ]
}

Media preference affinity routine 500 may end by returning the recommended user set data structure, or a corresponding recommended user set data structure identifier, at termination block 599.

Recommended User Set Selection Sub-Routine

Figure 6:
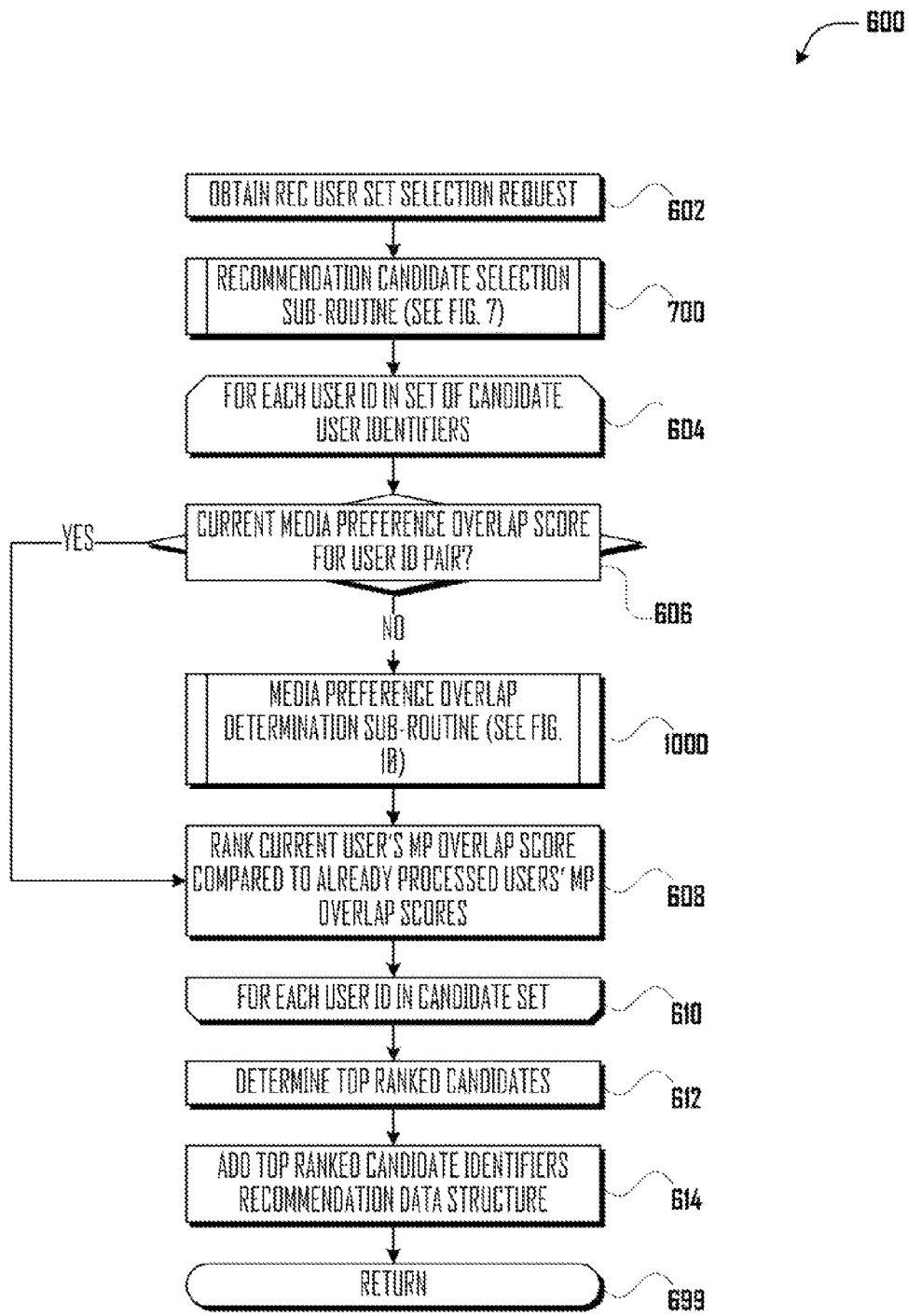
FIG. 6 illustrates a flow-diagram of a recommended user set selection sub-routine in accordance with at least one embodiment.

FIG. 6 illustrates an exemplary recommended user set selection sub-routine 600, which may be implemented by media preference affinity service 323C.

Recommended user set selection sub-routine 600 may obtain a recommended user set selection request at execution block 602, e.g. as a result of being called by media preference affinity routine 500. The recommended user set selection request may include a subject user identifier and/or a recommended user set data structure identifier.

At sub-routine block 700, recommended user set selection sub-routine 600 may provide candidate user identifier request to recommendation candidate selection sub-routine 700, described below with reference to FIG. 7. Recommendation candidate selection sub-routine 700 may return a set of candidate user identifiers.

At starting loop block 604, recommended user set selection sub-routine 600 may process each candidate user identifier in the set of candidate user identifiers in turn.

At decision block 606, if there is a current media preference overlap score associated with the combination of the subject user identifier and the current candidate user identifier, e.g. due to a recently run batch job, then recommended user set selection sub-routine 600 may proceed to execution block 608; otherwise recommended user set selection sub-routine 600 may proceed to sub-routine block 1000.

At sub-routine block 1000, recommended user set selection sub-routine 600 may provide a calculate overlap request to media preference overlap score sub-routine 1000, described below with reference to FIG. 10. Media preference overlap score sub-routine 1000 may return a media preference overlap score for the current candidate user identifier and the subject user identifier.

Recommended user set selection sub-routine 600 may rank the media preference overlap score for the current candidate user identifier and the subject user identifier's media preference overlap score with respect to the media preference overlap scores of already processed candidate user identifiers and the subject user identifier, if any, at execution block 608.

At ending loop block 610, recommended user set selection sub-routine 600 may loop back to staring loop block 604 to process the next candidate user identifier in the set of candidate user identifiers, if any.

Recommended user set selection sub-routine 600 may select a sub-set oft candidate user identifiers having the highest content overlap ranking at execution block 612.

Recommended user set selection sub-routine 600 may add the t selected candidate user identifiers to the recommendation data structure at execution block 614.

Recommended user set selection sub-routine 600 may end at termination block 699.

Recommendation Candidate Selection Sub-Routine

Figure 7:
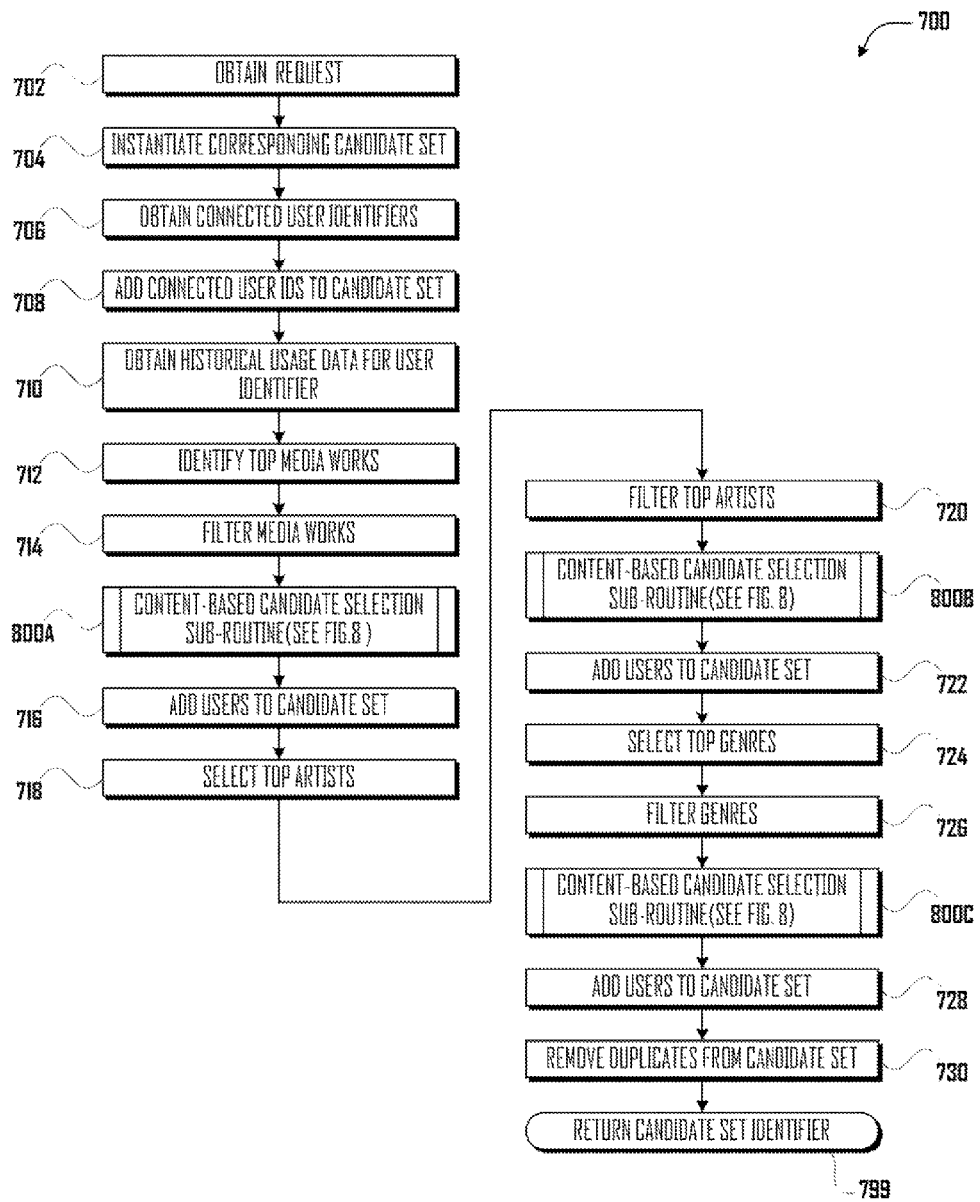
FIG. 7 illustrates a flow-diagram of a recommendation candidate selection sub-routine in accordance with at least one embodiment.

FIG. 7 illustrates an exemplary recommendation candidate selection sub-routine 700, which may be implemented by media preference affinity service 323C.

Recommendation candidate selection sub-routine 700 may obtain a recommendation candidate selection request at execution block 702. The recommendation candidate selection request may include a user identifier ("subject user identifier").

Recommendation candidate selection sub-routine 700 may instantiate a candidate user set data structure at execution block 704.

An exemplary candidate user set data structure upon instantiation:

Candidate_user_set_DS {NULL}.

Recommendation candidate selection sub-routine 700 may obtain a set of n user identifiers corresponding to user profiles with an existing association with the subject user identifier at execution block 706. For example, recommendation candidate selection sub-routine 700 may query admin database 111 to obtain a set of connected (e.g. followed/favorited/friended) user identifiers associated with the current user identifier.

Recommendation candidate selection sub-routine 700 may add the associated user identifiers to the candidate user set data structure at execution block 708.

Candidate_user_set_DS {assoc_user_id1; assoc_user_id2; . . . assoc_user_idn}

Recommendation candidate selection sub-routine 700 may obtain historical usage data associated with the subject user identifier at execution block 710. For example, recommendation candidate selection sub-routine 700 may query historical usage data base 113 to obtain media content category data (e.g. title, author, genre, and the like) relating to the media work interaction history associated with the subject user identifier and corresponding to instances of the media content categories the subject user identifier has most frequently interacted with. Such instances of the media content categories may be media work identifiers, media work set identifiers, media work author identifiers, and media work genre identifiers, and the like. In the case of sound recordings, for example, the media content categories may be song titles, album titles, artist names, and the like. In the case of audio/visual works, such as movies, the media content categories may be movie titles, director names, actor names, and the like. In the case of literary works, such as books, the media content categories may be book titles, author names, and the like.

Recommendation candidate selection sub-routine 700 may select a set of media work identifiers associated with the media works the obtained historical usage data indicates the user account associated with the subject user identifier has frequently interacted with at execution block 712.

Recommendation candidate selection sub-routine 700 may filter the selected set of media work identifiers at execution block 714. For example, recommendation candidate selection sub-routine 700 may compare the selected set of media work identifiers to an existing set of media work identifiers corresponding to those media works that are globally popular across the digital media distribution system (e.g. "top 40" songs, "best-selling" books, "top box office" movies, and the like) and remove any media work identifiers from the former set of that are also found in the latter.

At sub-routine block 800A, recommendation candidate selection sub-routine 700 may provide a content-based candidate selection request to content-based candidate selection sub-routine 800, described below in reference to FIG. 8. Content-based candidate selection sub-routine 800 may return a set of candidate user identifiers, including m user identifiers associated with m user accounts who have most frequently interacted with the set of media work identifiers selected at execution block 712.

Recommendation candidate selection sub-routine 700 may add the m candidate user identifiers to the candidate user set data structure at execution block 716:

candidate_user_set_DS {assoc_user_id1; assoc_user_id2; . . . assoc_user_idn; mw_set_user_id1; mw_set_user_id2; . . . mw_set_user_idm}

Recommendation candidate selection sub-routine 700 may select a set of media work author identifiers associated with the media work authors that the obtained historical usage data indicates the user account associated with the subject user identifier has frequently interacted with at execution block 718.

Recommendation candidate selection sub-routine 700 may filter the selected set of media work author identifiers at execution block 720. For example, recommendation candidate selection sub-routine 700 may remove globally popular media work author identifiers in the same manner as execution block 714, described above.

At sub-routine block 800B, recommendation candidate selection sub-routine 700 may again provide a content-based candidate selection request to content-based candidate selection sub-routine 800. Content-based candidate selection sub-routine 800 may return a set of candidate user identifiers including p user identifiers associated with p user accounts who have most frequently interacted with the set of media work author identifiers selected at execution block 718.

Recommendation candidate selection sub-routine 700 may add the p candidate user identifiers to the candidate_user_set_data structure at execution block 722:

Candidate_user_set_DS {assoc_user_id_1; assoc_user_id_2; . . . assoc_user_id_n; mw_set_user_id_1; mw_set_user_id_2; . . . mw_set_user_id_m; auth_user_id_1; auth_user_id_2; . . . auth_user_id_p}

Recommendation candidate selection sub-routine 700 may select a set of media work genre identifiers associated with the media work genres the obtained historical usage data indicates the user account associated with the subject user identifier has frequently interacted with at execution block 724.

Recommendation candidate selection sub-routine 700 may filter the selected set of media work genre identifiers at execution block 726. For example, recommendation candidate selection sub-routine 700 may compare the selected set of media work genre identifiers to an existing set of media work genre identifiers corresponding to high-specificity genres (examples of high-specificity genres in audio works include holiday music, religious music, sound tracks, karaoke tracks, interviews, comedy, remixes, acoustical, instrumental, and the like) and remove any media work genre identifiers from the former set of that are also found in the latter.

At sub-routine block 800C, recommendation candidate selection sub-routine 700 may again provide a content-based candidate selection request to content-based candidate selection sub-routine 800. Content-based candidate selection sub-routine 800 may return a set of candidate user identifiers including q user identifiers associated with q user accounts who have most frequently interacted with the set of media work genre identifiers.

Recommendation candidate selection sub-routine 700 may add the q candidate user identifiers to the candidate_user_set_data structure at execution block 728:

Candidate_user_set_DS {assoc_user_id_1; assoc_user_id_2; . . . assoc_user_id_n; mw_set_user_id_1; mw_set_user_id_2; . . . mw_set_user_id_m; auth_user_id_1; auth_user_id_2; . . . auth_user_id_p; genre_user_id_1; genre_user_id_2; . . . genre_user_id_q}

Recommendation candidate selection sub-routine 700 may remove any duplicate user identifiers from the candidate_user_set_data structure at execution block 730.

Recommendation candidate selection sub-routine 700 may end at termination block 799.

Content-Based Candidate Selection Sub-Routine

Figure 8:
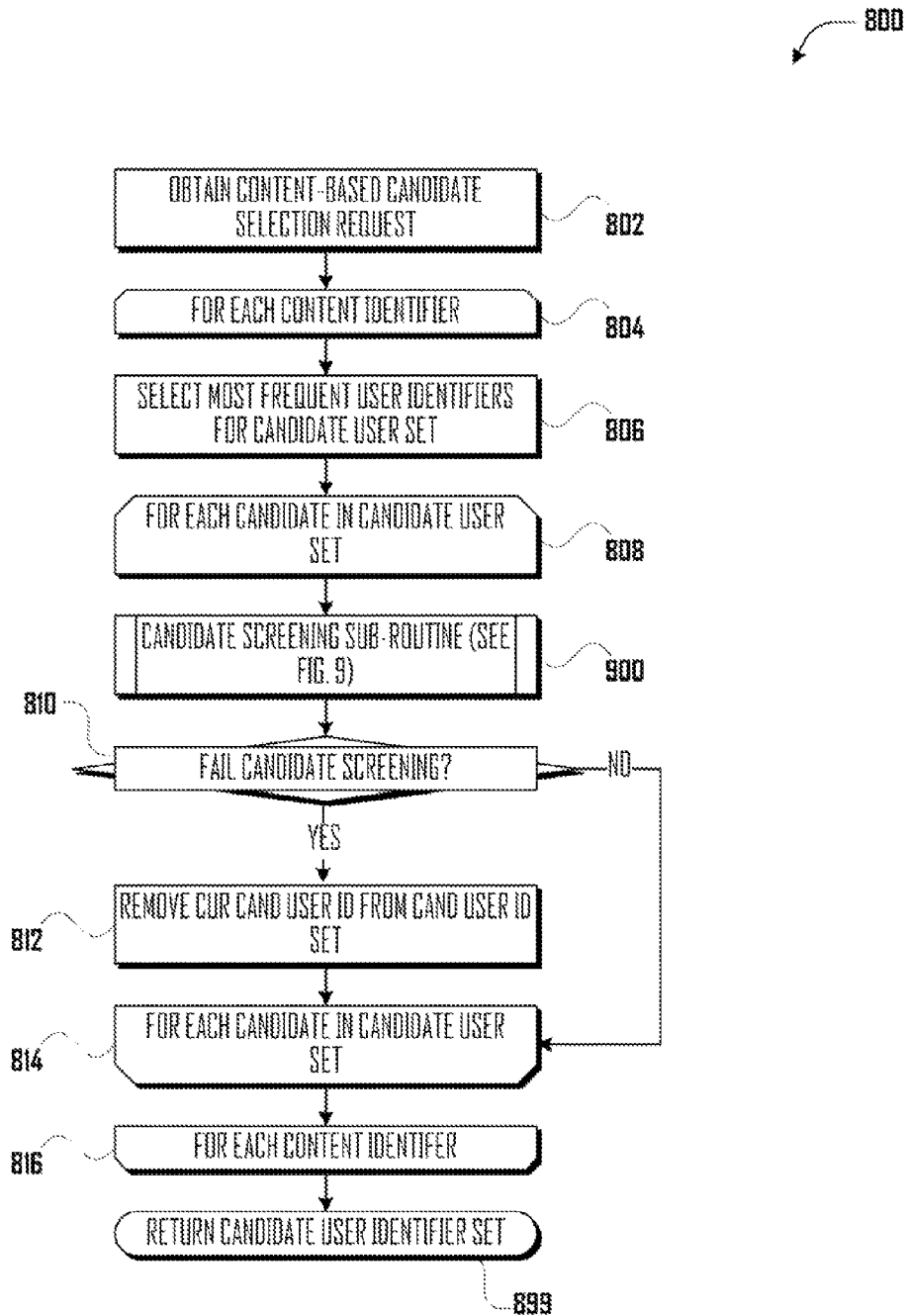
FIG. 8 illustrates a flow-diagram of a content-based candidate selection sub-routine in accordance with at least one embodiment.

FIG. 8 illustrates an exemplary content-based candidate selection sub-routine 800, which may be implemented by media preference affinity service 323C.

Content-based candidate selection sub-routine 800 may obtain a content-based candidate selection request at execution block 802. The content-based candidate selection request may include a set of media content identifiers corresponding to specific instances of various categorical classes of media works, such as media work identifiers, media work author identifiers, media work genre identifiers, and the like.

At starting loop block 804, content-based candidate selection sub-routine 800 may process each obtained class instance identifier in turn.

Content-based candidate selection sub-routine 800 may select a set of candidate user identifiers associated with those user accounts who have most frequently interacted with the class instance identifier at execution block 806.

At starting loop block 808, content-based candidate selection sub-routine 800 may process each candidate user identifier in the set of candidate user identifiers in turn.

At sub-routine block 900, content-based candidate selection sub-routine 800 may provide a candidate screening request to candidate screening sub-routine 900 described below in reference to FIG. 9. Candidate screening sub-routine 900 may return a binary value, e.g. pass/fail, true/false, yes/no, and the like, indicating whether or not the user identifier passes a candidate screening test.

At decision block 810, if the result of sub-routine block 900 indicates the current user identifier failed the candidate screening test, then content-based candidate selection sub-routine 800 may proceed to execution block 812; otherwise content-based candidate selection sub-routine 800 may proceed to starting loop block 814.

Content-based candidate selection sub-routine 800 may remove the current candidate user identifier from the candidate user identifier set at execution block 812.

At ending loop block 814, content-based candidate selection sub-routine 800 may loop back to starting loop block 808 to process the next candidate user identifier in the candidate user identifier set, if any.

At ending loop block 816, content-based candidate selection sub-routine 800 may loop back to starting loop block 804 to process the next obtained class instance identifier, if any.

Content-based candidate selection sub-routine 800 may return the candidate user identifier set at termination block 899.

Candidate Screening Sub-Routine

Figure 9:
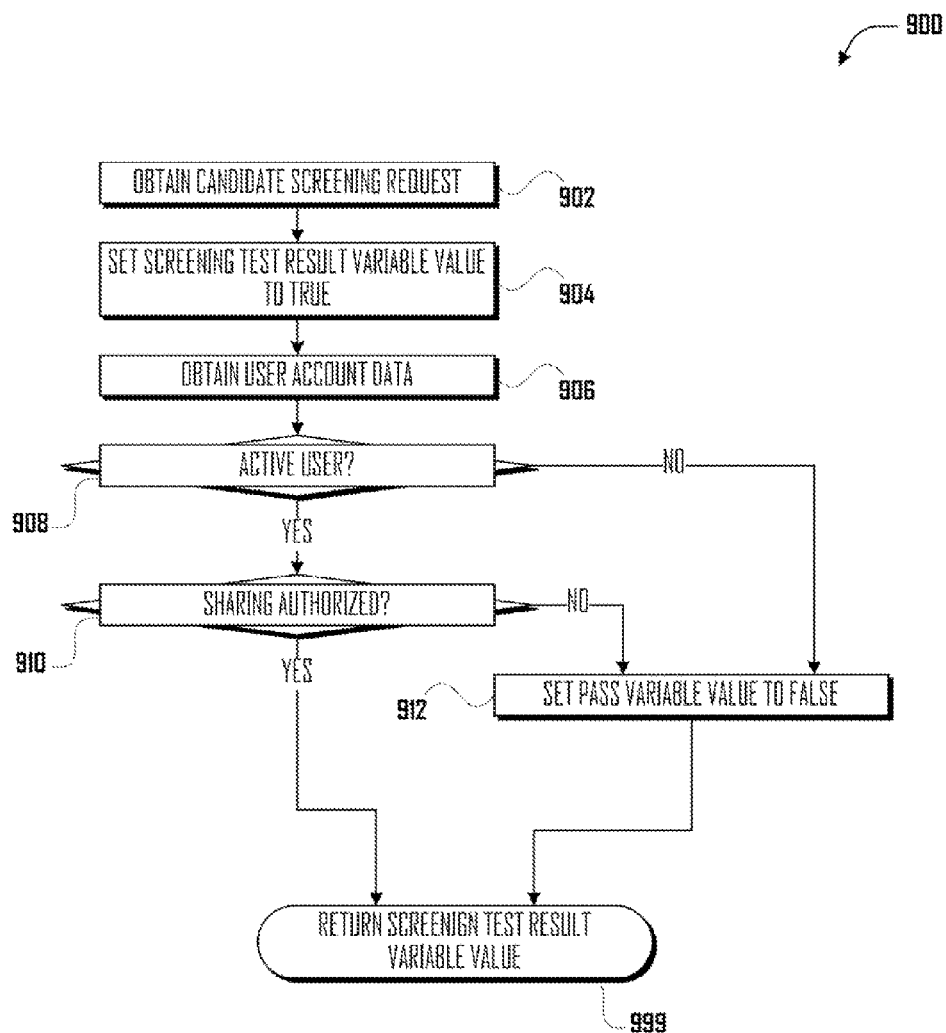
FIG. 9 illustrates a flow-diagram of a candidate screening sub-routine in accordance with at least one embodiment.

FIG. 9 illustrates an exemplary candidate screening sub-routine 900, which may be implemented by media preference affinity service 323C.

Candidate screening sub-routine 900 may obtain a candidate screening request at execution block 902. The candidate screening request may include a user identifier.

Candidate screening sub-routine 900 may set the value of a screening test result variable to pass, or true, at execution block 904.

Candidate screening sub-routine 900 may obtain data relating to the user account associated with the user identifier at execution block 906.

At decision block 908, if the user identifier is associated with an "active" user account, then candidate screening sub-routine 900 may proceed to decision block 910; otherwise candidate screening sub-routine 900 may proceed to execution block 912. An "active" user account may refer to a user account that is associated with a current subscription. Alternatively, an "active" user account may refer to a user account that has been used within a predetermined time period, e.g. the last three months.

At decision block 910, if the user identifier is associated with a user account that has authorized sharing user profile data and historical usage data associated with the user identifier, then candidate screening sub-routine 900 may proceed to termination block 999; otherwise candidate screening sub-routine 900 may proceed to execution block 912, e.g. to comply with user privacy settings.

Candidate screening sub-routine 900 may set the value of the screening test result variable to false at execution block 912.

Candidate screening sub-routine 900 may end by returning the value of the screening test result variable at termination block 999.

Media Preference Overlap Score Sub-Routine

Figure 10:
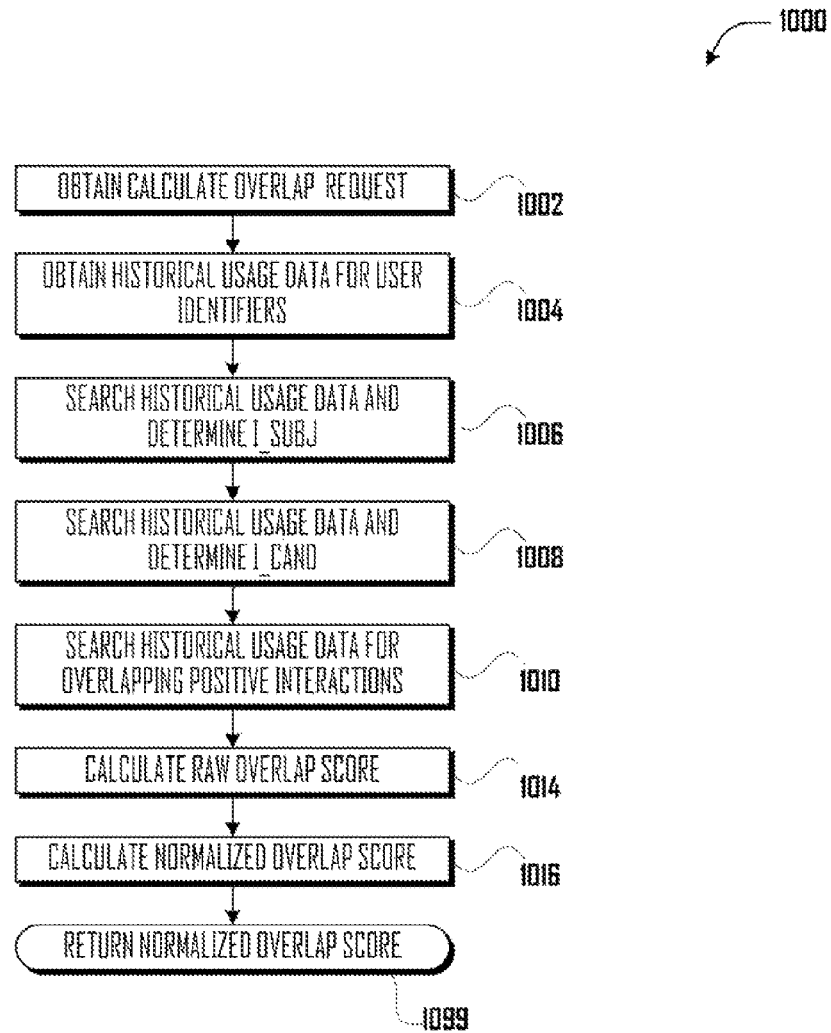
FIG. 10 illustrates a flow-diagram of a media preference overlap score sub-routine in accordance with at least one embodiment.

FIG. 10 illustrates an exemplary media preference overlap score sub-routine 1000, which may be implemented by media preference affinity service 323C.

Media preference overlap score sub-routine 1000 may obtain a media preference overlap score request at execution block 1002. The media preference overlap score request may include a subject user identifier, a candidate user identifier, an optional overlap time period value, and an optional categorical class identifier.

Media preference overlap score sub-routine 1000 may obtain historical usage data related to the provided categorical class identifier, if provided (or, if not, a default categorical class, such as media works), for the subject user identifier and the candidate user identifier over a time period specified by the overlap time period value, if provided (or, if not, a default time period, such as one year) at execution block 1004.

Media preference overlap score sub-routine 1000 may search the obtained historical usage data and determine a total number ($I_{subj}$) of positive media work interactions between the subject user identifier and the current categorical class identifier at execution block 1006. For example, if the categorical class is media works, then media preference overlap score sub-routine 1000 may search the obtained historical usage data and identify all media work identifiers associated with positive interactions with the subject user identifier during the specified (or default) time period.

Media preference overlap score sub-routine 1000 may search the obtained historical usage data and determine a total number ($I_{cand}$) of positive media work interactions between the candidate user identifier and the current categorical class identifier at execution block 1008.

Media preference overlap score sub-routine 1000 may search the obtained historical usage data and identify a number j of overlapping categorical class identifiers corresponding to categorical class identifiers associated with positive interactions with both the subject user identifier and the candidate user identifier, at execution block 1010.

Media preference overlap score sub-routine 1000 may determine a raw overlap score ($S_R$) between the subject user identifier and the candidate user identifier at execution block 1014. For example, the raw overlap score ($S_R$) may be calculated using the equation, where $q_{sf}$ represents an optional scaling factor:

$$S_R = \frac{q_{sf} j}{I_{subj} + I_{cand}}$$

Media preference overlap score sub-routine 1000 may calculate a normalized overlap score ($S_N$) between the subject user identifier and candidate user identifier at execution block 1016. For example, the normalized overlap score ($S_N$) may be calculated using the equation:

$$S_N = 10\sqrt{10\sqrt{10\sqrt{S_R}}}$$

Media preference overlap score sub-routine 1000 end by returning the value of the normalized score ($S_N$) at termination block 1099.

User-Based Media Content Recommendation Sub-Routine

Figure 11A:
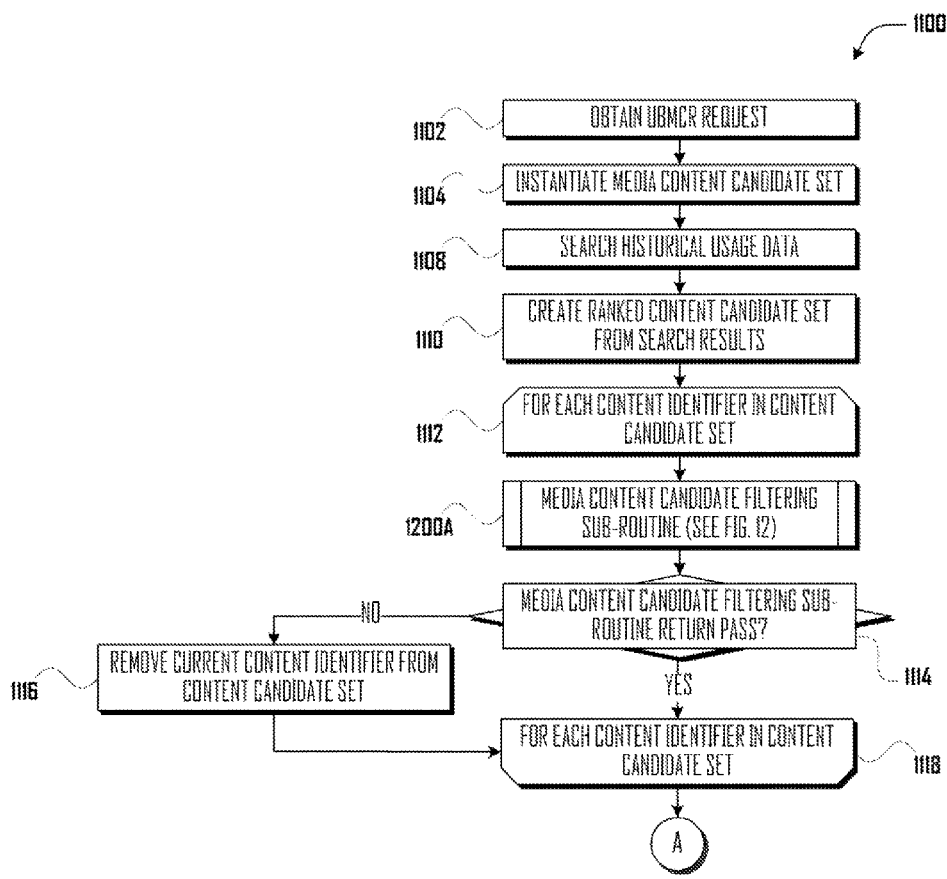
FIGS. 11A-B illustrate a flow-diagram of a user-based media content recommendation sub-routine in accordance with at least one embodiment.
Figure 11B:
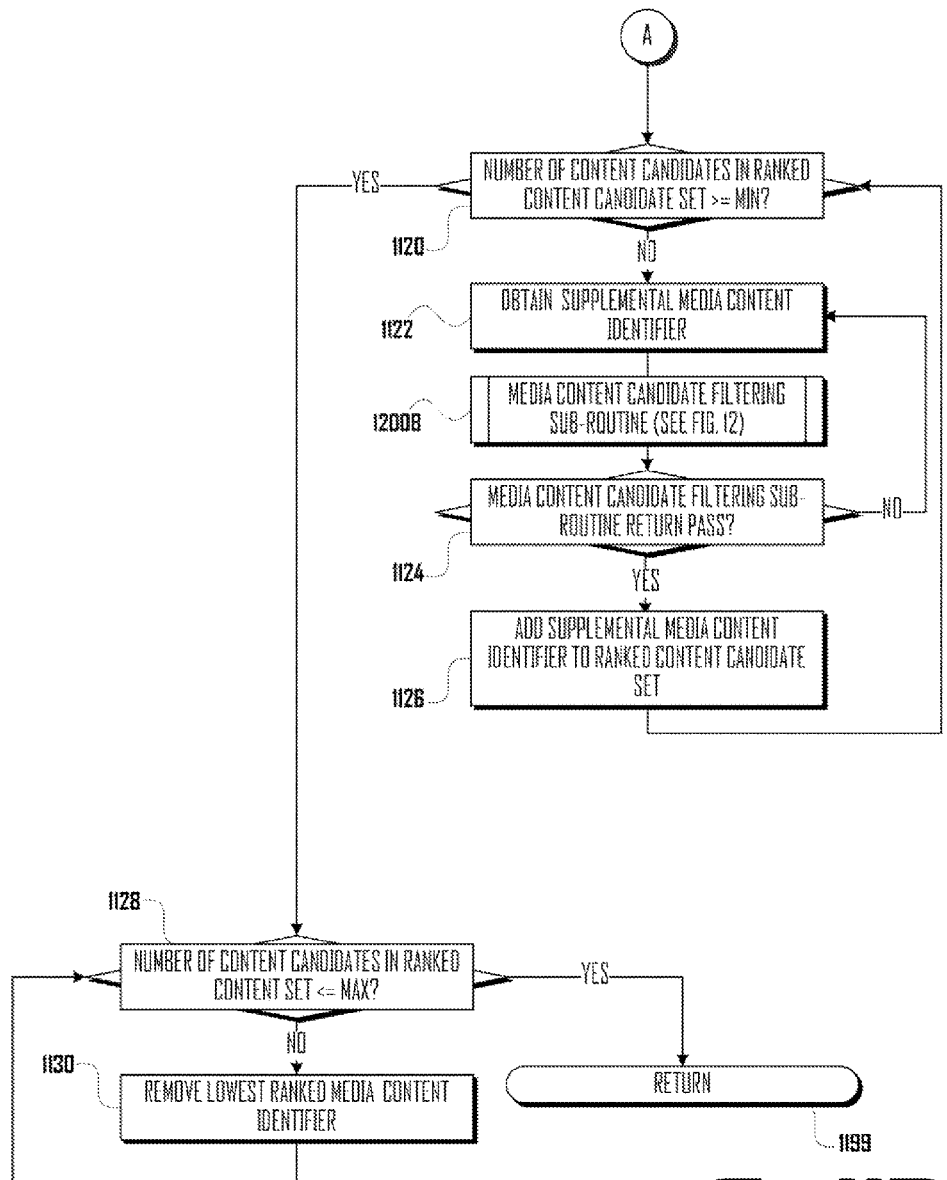

FIGS. 11A-B illustrate an exemplary user-based media content recommendation sub-routine 1100, which may be implemented by media preference affinity service 323C.

Exemplary user-based media content recommendation sub-routine 1100 populates a recommended user set data structure with media content recommendations corresponding to a single category of media content: e.g., media works, media work authors, media work collections, and the like. In other embodiments, the recommended user set data structure may have an additional categorical class dimension for multiple categories of user-based recommended content. In such embodiments, a sub-routine such as media content recommendation sub-routine 1100 may be called for each categorical class dimension in the recommended user set data structure.

Referring to FIG. 11A, user-based media content recommendation sub-routine 1100 may obtain a user-based media content recommendation (UBMCR) request at execution block 1102. The UBMCR request may include a subject user identifier and a recommended user identifier. If he UBMCR request may also include a categorical class identifier (e.g. media works, media work authors, media work collections) and an optional media work genre identifier. The optional media work genre identifier may be used to limit the recommended media content to the specified media work genre.

User-based media content recommendation sub-routine 1100 may instantiate a media content candidate set associated with the recommended user identifier within the recommended user set data structure at execution block 1104.

User-based media content recommendation sub-routine 1100 may search the historical usage data associated with the recommended user identifier, identify media content identifiers having history of interaction with the recommended user identifier, and populate the media content candidate set with the identified media content identifiers at execution block 1108.

User-based media content recommendation sub-routine 1100 may assign a relative ranking to each media content identifier in the media content candidate set at execution block 1110. For example, user-based media content recommendation sub-routine 1100 may rank each media content identifier according to the recommended user identifier's total positive interaction count, recent positive interaction frequency, and/or the like with the candidate media work identifier. The ranking of a media content identifier may also be affected by any negative interaction history with the recommended user identifier.

At starting loop block 1112, user-based media content recommendation sub-routine 1100 may process in turn each media content identifier in the media content candidate set.

At sub-routine block 1200A, user-based media content recommendation sub-routine 1100 may call media content candidate filtering sub-routine 1200, described below in reference to FIG. 12. Media content candidate filtering sub-routine 1200 may return a binary value, e.g. pass/fail, true/false, yes/no, and the like, indicating whether or not the media content identifier passes a media content candidate filtering test.

At decision block 1114, if sub-routine block 1200A returns a "pass" value, then media content candidate filtering sub-routine 1200 may proceed to ending loop block 1118; otherwise media content candidate filtering sub-routine 1200 may proceed to execution block 1116.

Media content candidate filtering sub-routine 1200 may remove the current media content identifier from the media content candidate set at execution block 1116.

At ending loop block 1118, media content candidate filtering sub-routine 1200 may loop back to staring loop block 1112 to process the next media content identifier of the media content candidate set, if any.

Referring now to FIG. 11B, at decision block 1120, if the number of media content identifiers remaining in the media content candidate set is greater than or equal to a predefined minimum number of media content identifiers, then user-based media content recommendation sub-routine 1100 may proceed to decision block 1128; otherwise user-based media content recommendation sub-routine 1100 may proceed to execution block 1122.

User-based media content recommendation sub-routine 1100 may obtain one or more supplemental media content identifiers at execution block 1122. For example, user-based media content recommendation sub-routine 1100 may select one or more top ranked user identifiers associated with the media genre identifier and select a highly ranked media content identifier from the historical usage data associated with the selected user identifiers.

At sub-routine block 1200B, user-based media content recommendation sub-routine 1100 may again call media content candidate filtering sub-routine 1200.

At decision block 1124, if sub-routine block 1200B returns a "pass" value, then media content candidate filtering sub-routine 1200 may proceed to execution block 1126; otherwise media content candidate filtering sub-routine 1200 may loop back to execution block 1122.

Media content candidate filtering sub-routine 1200 may add the supplemental media content identifier to the media content candidate set at execution block 1126.

At decision block 1128, if the number of media content identifiers remaining in the media content candidate set is less than a predefined maximum number of media content identifiers, then user-based media content recommendation sub-routine 1100 may proceed to termination block 1199; otherwise user-based media content recommendation sub-routine 1100 may proceed to execution block 1130.

User-based media content recommendation sub-routine 1100 may remove the lowest ranked media content identifier from the media content candidate set at execution block 1130, and may return to decision block 1128.

User-based media content recommendation sub-routine 1100 may end by returning the media content candidate set, or the associated media content candidate set identifier, at termination block 1199.

Media Content Candidate Filtering Sub-Routine

Figure 12:
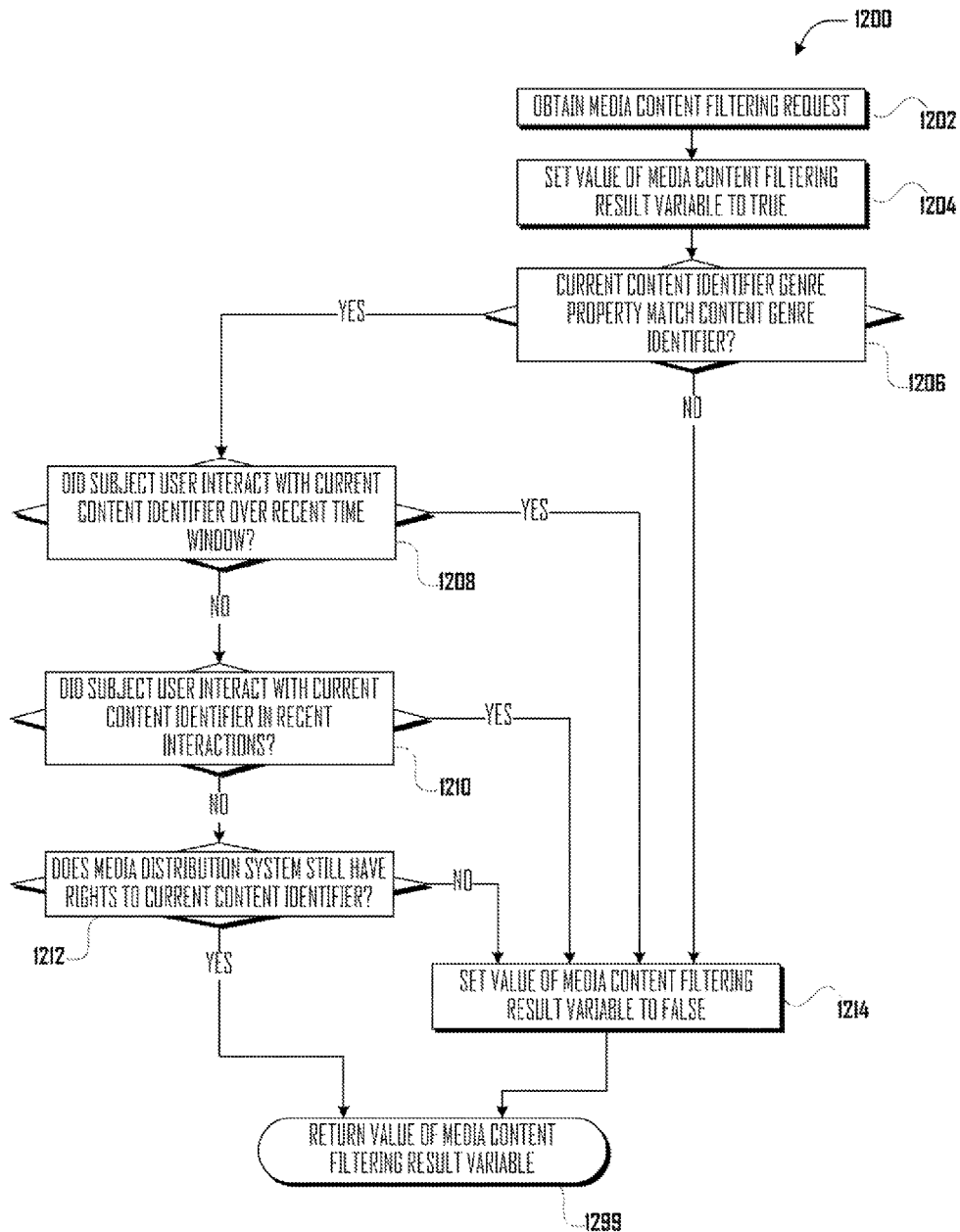
FIG. 12 illustrates a flow-diagram of a media content candidate filtering sub-routine in accordance with at least one embodiment.

FIG. 12 illustrates an exemplary media content candidate filtering sub-routine 1200, which may be implemented by media preference affinity service 323C.

Media content candidate filtering sub-routine 1200 may obtain a media content filtering request at execution block 1202. The media content filtering request may include a media content identifier, a subject user identifier, and a media work genre identifier.

Media content candidate filtering sub-routine 1200 may set the value of a media content filtering result variable to true at execution block 1204.

At decision block 1206, if a media work genre property associated with the media content identifier matches the included media work genre identifier, then media content candidate filtering sub-routine 1200 may proceed to execution block 1214; otherwise media content candidate filtering sub-routine 1200 may proceed to decision block 1208.

At decision block 1208, if historical usage data associated with the subject user identifier indicates the subject user identifier has interacted with the media content identifier during a predefined time window (e.g. the last thirty days), then media content candidate filtering sub-routine 1200 may proceed to execution block 1214; otherwise media content candidate filtering sub-routine 1200 may proceed to decision block 1210.

At decision block 1210, if historical usage data associated with the subject user identifier indicates the subject user identifier has interacted with the media content identifier over a predefined number of recent media work interactions (e.g. the last five hundred media work interactions), then media content candidate filtering sub-routine 1200 may proceed to execution block 1214; otherwise media content candidate filtering sub-routine 1200 may proceed to decision block 1212.

At decision block 1212, if the media distribution system still has rights to distribute the media content associated with the media content identifier, then media content candidate filtering sub-routine may proceed to termination block 1299; otherwise media content candidate filtering sub-routine may proceed to execution block 1214.

Media content candidate filtering sub-routine 1200 may set the value of a media content filtering result variable to false at execution block 1214.

Media content candidate filtering sub-routine 1200 may end by returning the value of the media content filtering result variable at termination block 1299.

CONCLUSION

Although specific embodiments have been illustrated and described herein, a variety of alternate and/or equivalent implementations may be substituted for the specific embodiments shown and described without departing from the scope of the present disclosure. This application is intended to cover any adaptations or variations of the embodiments discussed herein.

In some embodiments, a computing device may include a computer processing unit; a network interface in data communication with the computer processing unit and a data store; and/or memory in data communication with the computer processing unit, and containing executable instructions for causing the computer processing unit to perform a method providing at least one recommended media content identifier targeted to a subject user identifier.

In some embodiments, the method may include obtaining historical usage data associated with the subject user identifier; identifying a group of candidate user identifiers using the historical usage data associated with the subject user identifier; obtaining a group of media preference overlap scores, each media preference overlap score of the group of media preference overlap scores; assigning rank values to the group of candidate user identifiers according to the group of media preference overlap scores; selecting a first candidate user identifier of the group of candidate user identifiers based on the rank values; obtaining historical usage data associated with the first candidate user identifier; selecting at least one media content identifier associated with the first candidate user identifier; and/or providing the at least one media content identifier as the at least one recommended media content identifier.

In some embodiments, a corresponding candidate user identifier of the group of candidate user identifiers may be determined relative to the corresponding candidate user identifier of the group of candidate user identifiers and the subject user identifier.

In some embodiments, identifying the group of candidate user identifiers using the historical usage data associated with the subject user identifier may include using the historical usage data associated with the subject user identifier to identify those user identifiers the subject user identifier has selectively connected with as candidate user identifiers.

In some embodiments, identifying the group of candidate user identifiers using the historical usage data associated with the subject user identifier may include using the historical usage data associated with the subject user identifier to identify a group of media work identifiers and/or identifying those user identifiers having a positive interaction record associated with at least one media work identifier of the group of media work identifiers as candidate user identifiers.

In some embodiments, the group of media work identifiers corresponding to media work identifiers may include a positive interaction record associated with the subject user identifier.

In some embodiments, identifying the group of candidate user identifiers using the historical usage data associated with the subject user identifier may include using the historical usage data associated with the subject user identifier to identify a group of media work author identifiers and/or identifying those user identifiers having a positive interaction record associated with at least one media work author identifier of the group of media work author identifiers as candidate user identifiers.

In some embodiments, the group of media work author identifiers corresponding to media work author identifiers may include a positive interaction record associated with the subject user identifier.

In some embodiments, identifying the group of candidate user identifiers using the historical usage data associated with the subject user identifier may include using the historical usage data associated with the subject user identifier to identify a group of media work set identifiers and/or identifying those user identifiers having a positive interaction record associated with at least one media work set identifier of the group of media work set identifiers as candidate user identifiers.

In some embodiments, the group of media work set identifiers corresponding to media work set identifiers may include a positive interaction record associated with the subject user identifier.

In some embodiments, selecting the at least one recommended media content identifier associated with the first candidate user identifier may include identifying a group of candidate media content identifiers associated with positive interactions with the first candidate user identifier using the historical usage data associated with the first user identifier and/or filtering the group of candidate media content identifiers based on the historical usage data associated with the subject user identifier to remove those media content identifiers having a recent history of interaction with the subject user identifier from the group of candidate media content identifiers.

In some embodiments, the method may include obtaining a media genre identifier and the at least one media content identifier is also associated with the media genre identifier.

In some embodiments, the method may include selecting a media genre identifier using the historical usage data associated with the subject user identifier and the at least one media content identifier is also associated with the media genre identifier.

Other embodiments of the present methods and systems may be used to provide a current user with a media preference overlap score relative to another user to enable the current user to make informed decisions regarding selectively creating connections between the current user's account and the profiles of other users (e.g. by "following," "favoriting," or "friending" another user). For example, if a current user views another user's profile (or a profile preview, e.g. in search results), the digital media distribution system may provide a media preference overlap score value for the other user with respect to the current user using a similar methodology to that used in calculating the normalized overlap score ($S_N$), described above.

Other embodiments of the present methods and systems may be used to provide collaborative media content recommendations for multiple subject users. For example, a group of users may wish to create a collaborative media work set based on a combination of their media preferences, such creating collaborative song playlist for a shared listening experience, such as a car ride or social gathering. In one variation of such an embodiment, individual sets of recommended media content identifiers may be generated for each user and then compared to each other, with recommended media content identifiers appearing in a predetermined number of the individual sets being added to collaborative set (e.g. at least two, at least half, etc.).

What is claimed is:
1. A computing device comprising:
a computer processing unit;
a network interface in data communication with said computer processing unit and a data store; and
memory in data communication with said computer processing unit, and containing executable instructions for causing said computer processing unit to perform a method of providing at least one recommended media content identifier targeted to a subject user identifier, the method including:
  obtaining historical usage data associated with the subject user identifier;
  identifying a plurality of candidate user identifiers using said historical usage data associated with the subject user identifier;
  obtaining a plurality of media preference overlap scores, each media preference overlap score of said plurality of media preference overlap scores being associated with a corresponding candidate user identifier of said plurality of candidate user identifiers and being determined relative to said corresponding candidate user identifier of said plurality of candidate user identifiers and the subject user identifier;
  assigning rank values to said plurality of candidate user identifiers according to said plurality of media preference overlap scores;
  selecting a first candidate user identifier of said plurality of candidate user identifiers based on said rank values;
  obtaining historical usage data associated with the first candidate user identifier;
  selecting at least one media content identifier associated with said first candidate user identifier using said historical usage data associated with said first candidate user identifier; and
  providing, by said computer processing unit, said at least one media content identifier as the at least one recommended media content identifier via a display device.

2. The computing device of claim 1, wherein identifying said plurality of candidate user identifiers using said historical usage data associated with the subject user identifier includes using said historical usage data associated with the subject user identifier to identify those user identifiers the subject user identifier has selectively indicated as candidate user identifiers.

3. The computing device of claim 1, wherein identifying said plurality of candidate user identifiers using said historical usage data associated with the subject user identifier includes:
  using said historical usage data associated with the subject user identifier to identify a plurality of media work identifiers, said plurality of media work identifiers corresponding to media work identifiers having a positive interaction record associated with the subject user identifier; and
  identifying those user identifiers having a positive interaction record associated with at least one media work identifier of said plurality of media work identifiers as candidate user identifiers.

4. The computing device of claim 1, wherein identifying said plurality of candidate user identifiers using said historical usage data associated with the subject user identifier includes:
  using said historical usage data associated with the subject user identifier to identify a plurality of media work author identifiers, said plurality of media work author identifiers corresponding to media work author identifiers having a positive interaction record associated with the subject user identifier; and
  identifying those user identifiers having a positive interaction record associated with at least one media work author identifier of said plurality of media work author identifiers as candidate user identifiers.

5. The computing device of claim 1, wherein identifying said plurality of candidate user identifiers using said historical usage data associated with the subject user identifier includes:
  using said historical usage data associated with the subject user identifier to identify a plurality of media work set identifiers, said plurality of media work set identifiers corresponding to media work set identifiers having a positive interaction record associated with the subject user identifier; and
  identifying those user identifiers having a positive interaction record associated with at least one media work set identifier of said plurality of media work set identifiers as candidate user identifiers.

6. The computing device of claim 1, wherein selecting said at least one recommended media content identifier associated with said first candidate user identifier using said historical usage data associated with said first candidate identifier includes using said historical usage data associated with said first user identifier to:
  identify a plurality of candidate media content identifiers associated with positive interactions with said first candidate user identifier; and
  filter said plurality of candidate media content identifiers based on said historical usage data associated with the subject user identifier to remove those media content identifiers having a recent history of interaction with the subject user identifier from said plurality of candidate media content identifiers.

7. The computing device of claim 1, wherein selecting said at least one recommended media content identifier associated with said first candidate user identifier further includes:
  identifying a plurality of candidate media content identifiers associated with positive interactions with said first candidate user identifier;
  obtaining historical usage data associated with said plurality of candidate media content identifiers; and
  filtering said plurality of candidate media content identifiers based on said historical usage data associated with said plurality of candidate media content identifiers to remove those media content identifiers having a recent history of general popularity from said plurality of candidate media content identifiers.

8. The computing device of claim 1, wherein selecting said at least one recommended media content identifier associated with said first candidate user identifier further includes:
  identifying a plurality of candidate media content identifiers associated with positive interactions with said first candidate user identifier;
  obtaining a current date; and
  filtering said plurality of candidate media content identifiers based on said historical usage data associated with said plurality of candidate media content identifiers to remove those media content identifiers having a history of interaction with said first candidate user identifier outside of a predefined amount of time from said current date.

9. The computing device of claim 1, wherein selecting said at least one recommended media content identifier associated with said first candidate user identifier further includes:
  identifying a plurality of candidate media content identifiers associated with positive interactions with said first candidate user identifier;

obtaining historical usage data associated with said plurality of candidate media content identifiers;
obtaining a media genre identifier; and
filtering said plurality of candidate media content identifiers based on said historical usage data associated with said plurality of candidate media content identifiers to remove those media content identifiers not associated with said media genre identifier.

10. The computing device of claim 1, wherein selecting said at least one recommended media content identifier associated with said first candidate user identifier further includes:
identifying a plurality of candidate media content identifiers associated with positive interactions with said first candidate user identifier;
obtaining historical usage data associated with said plurality of candidate media content identifiers;
selecting a media genre identifier using said historical usage data associated with the subject user identifier a media genre identifier; and
filtering said plurality of candidate media content identifiers based on said historical usage data associated with said plurality of candidate media content identifiers to remove those media content identifiers not associated with said media genre identifier.

11. A method performed by a computer processing unit comprising:
obtaining historical usage data associated with a subject user identifier;
identifying a plurality of candidate user identifiers using said historical usage data associated with the subject user identifier;
obtaining a plurality of media preference overlap scores, each media preference overlap score of said plurality of media preference overlap scores being associated with a corresponding candidate user identifier of said plurality of candidate user identifiers and being determined relative to said corresponding candidate user identifier of said plurality of candidate user identifiers and the subject user identifier;
assigning rank values to said plurality of candidate user identifiers according to said plurality of media preference overlap scores;
selecting a first candidate user identifier of said plurality of candidate user identifiers based on said rank values;
obtaining historical usage data associated with the first candidate user identifier;
selecting at least one media content identifier associated with said first candidate user identifier using said historical usage data associated with said first candidate user identifier; and
providing, by said computer processing unit, said at least one media content identifier as the at least one recommended media content identifier via a display device.

12. The method of claim 11, wherein identifying said plurality of candidate user identifiers using said historical usage data associated with the subject user identifier includes using said historical usage data associated with the subject user identifier to identify those user identifiers the subject user identifier has selectively indicated as candidate user identifiers.

13. The method of claim 11, wherein identifying said plurality of candidate user identifiers using said historical usage data associated with the subject user identifier includes:
using said historical usage data associated with the subject user identifier to identify a plurality of media work identifiers, said plurality of media work identifiers corresponding to media work identifiers having a positive interaction record associated with the subject user identifier; and
identifying those user identifiers having a positive interaction record associated with at least one media work identifier of said plurality of media work identifiers as candidate user identifiers.

14. The method of claim 11, wherein identifying said plurality of candidate user identifiers using said historical usage data associated with the subject user identifier includes:
using said historical usage data associated with the subject user identifier to identify a plurality of media work author identifiers, said plurality of media work author identifiers corresponding to media work author identifiers having a positive interaction record associated with the subject user identifier; and
identifying those user identifiers having a positive interaction record associated with at least one media work author identifier of said plurality of media work author identifiers as candidate user identifiers.

15. The method of claim 11, wherein identifying said plurality of candidate user identifiers using said historical usage data associated with the subject user identifier includes:
using said historical usage data associated with the subject user identifier to identify a plurality of media work set identifiers, said plurality of media work set identifiers corresponding to media work set identifiers having a positive interaction record associated with the subject user identifier; and
identifying those user identifiers having a positive interaction record associated with at least one media work set identifier of said plurality of media work set identifiers as candidate user identifiers.

16. The method of claim 11, wherein selecting said at least one recommended media content identifier associated with said first candidate user identifier using said historical usage data associated with said first candidate identifier includes using said historical usage data associated with said first user identifier to:
identify a plurality of candidate media content identifiers associated with positive interactions with said first candidate user identifier using said historical usage data associated with said first user identifier; and
filter said plurality of candidate media content identifiers based on said historical usage data associated with the subject user identifier to remove those media content identifiers having a recent history of interaction with the subject user identifier from said plurality of candidate media content identifiers.

17. The method of claim 11, wherein selecting said at least one recommended media content identifier associated with said first candidate user further includes:
identifying a plurality of candidate media content identifiers associated with positive interactions with said first candidate user identifier;
obtaining historical usage data associated with said plurality of candidate media content identifiers; and
filtering said plurality of candidate media content identifiers based on said historical usage data associated with said plurality of candidate media content identifiers to remove those media content identifiers having a recent history of general popularity from said plurality of candidate media content identifiers.

18. The method of claim 11, wherein selecting said at least one recommended media content identifier associated with said first candidate user further includes:
    identifying a plurality of candidate media content identifiers associated with positive interactions with said first candidate user identifier;
    obtaining a current date; and
    filtering said plurality of candidate media content identifiers based on said historical usage data associated with said plurality of candidate media content identifiers to remove those media content identifiers having a history of interaction with said first candidate user identifier outside of a predefined amount of time from said current date.

19. The method of claim 11, wherein selecting said at least one recommended media content identifier associated with said first candidate user identifier further includes:
    identifying a plurality of candidate media content identifiers associated with positive interactions with said first candidate user identifier;
    obtaining historical usage data associated with said plurality of candidate media content identifiers;
    obtaining a media genre identifier; and
    filtering said plurality of candidate media content identifiers based on said historical usage data associated with said plurality of candidate media content identifiers to remove those media content identifiers not associated with said media genre identifier.

20. The method of claim 11, wherein selecting said at least one recommended media content identifier associated with said first candidate user identifier further includes:
    identifying a plurality of candidate media content identifiers associated with positive interactions with said first candidate user identifier;
    obtaining historical usage data associated with said plurality of candidate media content identifiers;
    selecting a media genre identifier using said historical usage data associated with the subject user identifier a media genre identifier; and
    filtering said plurality of candidate media content identifiers based on said historical usage data associated with said plurality of candidate media content identifiers to remove those media content identifiers not associated with said media genre identifier.

21. A computing device comprising:
    a computer processing unit;
    a network interface in data communication with said computer processing unit and a data store; and
    memory in data communication with said computer processing unit, and containing executable instructions for causing said computer processing unit to perform a method of providing at least one recommended media content identifier targeted to a plurality of subject user identifiers, the method including:
        obtaining historical usage data associated with each of the plurality of subject user identifiers;
        obtaining a plurality of media preference overlap scores, each media preference overlap score of said plurality of media preference overlap scores being determined relative to a unique subject user identifier pair from the plurality of subject user identifiers;
        assigning rank values to each of said unique subject user identifier pairs according to said plurality of media preference overlap scores;
        selecting a first unique subject user identifier pair based on said rank values, said first unique subject user identifier pair including a first subject user identifier and a second subject user identifier;
        selecting at least one media content identifier associated with both said first subject user identifier and said second subject user identifier using said historical usage data associated with each of the plurality of subject user identifiers; and
        providing, by said computer processing unit, said at least one media content identifier as the at least one recommended media content identifier via a display device.

22. The computing device of claim 21, wherein selecting at least one media content identifier associated with both said first subject user identifier and said second subject user identifier includes using said historical usage data associated with of the plurality of subject user identifiers to:
    identify a plurality of candidate media content identifiers having a history of positive interaction with said first subject user identifier; and
    filter said plurality of candidate media content to remove those media content identifiers having no history of positive interaction with said second subject user identifier.

23. The computing device of claim 21, wherein selecting at least one media content identifier associated with both said first subject user identifier and said second subject user identifier further includes:
    identifying a plurality of candidate media content identifiers associated with positive interactions with said first candidate user identifier;
    obtaining historical usage data associated with said plurality of candidate media content identifiers; and
    filtering said plurality of candidate media content identifiers using said historical usage data associated with said plurality of candidate media content identifiers to remove those media content identifiers having a recent history of general popularity from said plurality of candidate media content identifiers.

24. The computing device of claim 21, wherein selecting at least one media content identifier associated with both said first subject user identifier and said second subject user identifier further includes:
    identifying a plurality of candidate media content identifiers associated with positive interactions with said first candidate user identifier;
    obtaining a current date;
    filtering said plurality of candidate media content identifiers using said historical usage data associated with the plurality of subject user identifiers to remove those media content identifiers having a history of positive interaction with said first candidate user identifier outside of a predefined amount of time from said current date; and
    filtering said plurality of candidate media content identifiers using said historical usage data associated with the plurality of subject user identifiers to remove those media content identifiers having a history of positive interaction with said second candidate user identifier outside of said predefined amount of time from said current date.

25. The computing device of claim 21, wherein selecting at least one media content identifier associated with both said first subject user identifier and said second subject user identifier further includes:
    identifying a plurality of candidate media content identifiers associated with positive interactions with said first candidate user identifier;

obtaining historical usage data associated with said plurality of candidate media content identifiers;

obtaining a media genre identifier; and filtering said plurality of candidate media content identifiers based on said historical usage data associated with said plurality of candidate media content identifiers to remove those media content identifiers not associated with said media genre identifier.

26. A method performed by a computer processing unit comprising:

obtaining historical usage data associated with each of a plurality of subject user identifiers;

obtaining a plurality of media preference overlap scores, each media preference overlap score of said plurality of media preference overlap scores being determined relative to a unique subject user identifier pair from the plurality of subject user identifiers;

assigning rank values to each of said unique subject user identifier pairs according to said plurality of media preference overlap scores;

selecting a first unique subject user identifier pair based on said rank values, said first unique subject user identifier pair including a first subject user identifier and a second subject user identifier;

selecting at least one media content identifier associated with both said first subject user identifier and said second subject user identifier using said historical usage data associated with each of the plurality of subject user identifiers; and providing, by said computer processing unit, said at least one media content identifier as the at least one recommended media content identifier via a display device.

27. The method of claim 26, wherein selecting at least one media content identifier associated with both said first subject user identifier and said second subject user identifier includes using said historical usage data associated with of the plurality of subject user identifiers to:

identify a plurality of candidate media content identifiers having a history of positive interaction with said first subject user identifier; and filter said plurality of candidate media content to remove those media content identifiers having no history of positive interaction with said second subject user identifier.

28. The method of claim 26, wherein selecting at least one media content identifier associated with both said first subject user identifier and said second subject user identifier further includes:

identifying a plurality of candidate media content identifiers associated with positive interactions with said first candidate user identifier;

filtering said plurality of candidate media content to remove those media content identifiers having a history of negative interaction with any of the plurality of subject user identifiers.

29. The method of claim 26, wherein selecting at least one media content identifier associated with both said first subject user identifier and said second subject user identifier further includes:

identifying a plurality of candidate media content identifiers associated with positive interactions with said first candidate user identifier;

obtaining historical usage data associated with said plurality of candidate media content identifiers;

obtaining a media genre identifier; and filtering said plurality of candidate media content identifiers based on said historical usage data associated with said plurality of candidate media content identifiers to remove those media content identifiers not associated with said media genre identifier.

30. The method of claim 26, wherein selecting at least one media content identifier associated with both said first subject user identifier and said second subject user identifier further includes:

identifying a plurality of candidate media content identifiers associated with positive interactions with said first candidate user identifier;

obtaining historical usage data associated with said plurality of candidate media content identifiers;

selecting a media genre identifier using said historical usage data associated with the subject user identifier a media genre identifier; and filtering said plurality of candidate media content identifiers based on said historical usage data associated with said plurality of candidate media content identifiers to remove those media content identifiers not associated with said media genre identifier.

* * * * *